United States Patent
Barta et al.

(10) Patent No.: US 8,327,290 B2
(45) Date of Patent: Dec. 4, 2012

(54) USER TASK INTERFACE IN A WEB APPLICATION

(75) Inventors: Gary T. Barta, Austin, TX (US); Velda A. Bartek, Apex, NC (US); Joseph A. Bohn, Durham, NC (US); Kathryn H. Britton, Chapel Hill, NC (US); Brock K. Brogan, Wake Forest, NC (US); Samar Choudhary, Morrisville, NC (US); Stefan Koch, Stuttgart (DE); Vijay Pandiarajan, Morrisville, NC (US); Douglas R. Petty, Rochester, MN (US); Joseph L. Saunders, Austin, TX (US); Carl S. Swanson, Austin, TX (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1664 days.

(21) Appl. No.: 10/819,053

(22) Filed: Apr. 6, 2004

(65) Prior Publication Data
US 2006/0031849 A1    Feb. 9, 2006

(51) Int. Cl.
*G06F 3/048* (2006.01)
(52) U.S. Cl. .................................................. 715/790
(58) Field of Classification Search ................... 715/790
See application file for complete search history.

(56) References Cited

U.S. PATENT DOCUMENTS

| | | | |
|---|---|---|---|
| 5,361,361 A | 11/1994 | Hickman et al. | |
| 5,893,916 A | 4/1999 | Dooley | |
| 6,011,537 A | 1/2000 | Slotznick | |
| 6,043,816 A * | 3/2000 | Williams et al. | 715/783 |
| 6,049,799 A | 4/2000 | Mangat et al. | |
| 6,219,700 B1 | 4/2001 | Chang et al. | |
| 6,240,410 B1 | 5/2001 | Wical | |
| 6,256,668 B1 | 7/2001 | Slivka et al. | |
| 6,281,900 B1 | 8/2001 | Ishikawa | |
| 6,353,446 B1 | 3/2002 | Vaughan et al. | |
| 6,510,466 B1 | 1/2003 | Cox et al. | |
| 6,563,514 B1 | 5/2003 | Samar | |
| 6,573,906 B1 | 6/2003 | Harding | |
| 6,584,496 B1 | 6/2003 | Ludtke | |
| 6,621,505 B1 | 9/2003 | Beauchamp et al. | |
| 6,799,198 B1 | 9/2004 | Huboi et al. | |
| 6,801,222 B1 | 10/2004 | Dunham et al. | |
| 6,820,094 B1 | 11/2004 | Ferguson et al. | |
| 6,918,090 B2 | 7/2005 | Hesmer et al. | |

(Continued)

OTHER PUBLICATIONS

Shortley, Tim et al., "Integrated Solutions Console: a unified portal for autonomic systems", IBM DeveloperWorks Live!, New Orleans, LA, Apr. 9-12, 2003 (15 pages).

(Continued)

*Primary Examiner* — William Bashore
*Assistant Examiner* — Henry Orr
(74) *Attorney, Agent, or Firm* — Marcia L. Doubet

(57) ABSTRACT

A task-like user interface is provided for Web-based applications. Preferred embodiments enable users to initiate multiple instances of tasks within a single Web application, where independent state information is retained for each instance. Each user-initiated task also has a prescribed life cycle with a definite start and end. Resources allocated to perform various activities can therefore be released when the activity ends. Optionally, contextual information can be passed to a task upon invocation. Support for persisting a currently-viewable work unit as a user-selectable favorite may optionally be provided.

14 Claims, 16 Drawing Sheets

U.S. PATENT DOCUMENTS

| | | | |
|---|---|---|---|
| 6,970,869 | B1 | 11/2005 | Slaughter et al. |
| 6,993,720 | B1 | 1/2006 | Hanoch et al. |
| 7,024,658 | B1 | 4/2006 | Cohen et al. |
| 7,028,264 | B2 | 4/2006 | Santoro et al. |
| 7,062,511 | B1 | 6/2006 | Poulsen |
| 7,072,807 | B2 | 7/2006 | Brown et al. |
| 7,181,698 | B2* | 2/2007 | Shahrbabaki et al. ........ 715/790 |
| 7,203,909 | B1 | 4/2007 | Horvitz et al. |
| 7,444,633 | B2* | 10/2008 | Bohn et al. .................... 718/100 |
| 7,493,563 | B2* | 2/2009 | Bohn et al. .................... 715/736 |
| 7,502,833 | B2* | 3/2009 | Schaeck ........................ 709/217 |
| 7,783,638 | B2 | 8/2010 | Choudhary et al. |
| 7,930,696 | B2* | 4/2011 | Bohn et al. .................... 718/100 |
| 7,933,632 | B2* | 4/2011 | Flynt et al. ................. 455/569.1 |
| 7,934,163 | B2* | 4/2011 | Musson et al. ................ 715/762 |
| 8,140,976 | B2* | 3/2012 | Bohn et al. .................... 715/736 |
| 2001/0034771 | A1 | 10/2001 | Hütsch et al. |
| 2002/0032763 | A1 | 3/2002 | Cox et al. |
| 2002/0053020 | A1 | 5/2002 | Teijido et al. |
| 2002/0054152 | A1 | 5/2002 | Palaniappan et al. |
| 2002/0063735 | A1 | 5/2002 | Tamir et al. |
| 2002/0091993 | A1 | 7/2002 | Walley et al. |
| 2002/0116454 | A1 | 8/2002 | Dyla et al. |
| 2002/0120607 | A1 | 8/2002 | Price et al. |
| 2002/0129136 | A1 | 9/2002 | Matharu |
| 2002/0143949 | A1* | 10/2002 | Rajarajan et al. ............ 709/226 |
| 2002/0146018 | A1 | 10/2002 | Kailamaki et al. |
| 2002/0147709 | A1 | 10/2002 | Rajarajan et al. |
| 2002/0149601 | A1 | 10/2002 | Rajarajan et al. |
| 2002/0158899 | A1* | 10/2002 | Raymond ..................... 345/736 |
| 2002/0161876 | A1 | 10/2002 | Raymond |
| 2002/0165745 | A1 | 11/2002 | Greene et al. |
| 2002/0178254 | A1 | 11/2002 | Brittenham et al. |
| 2002/0178290 | A1 | 11/2002 | Coulthard et al. |
| 2002/0188612 | A1 | 12/2002 | Yu et al. |
| 2002/0188613 | A1 | 12/2002 | Chakraborty et al. |
| 2003/0001875 | A1 | 1/2003 | Black et al. |
| 2003/0018650 | A1 | 1/2003 | Priestley |
| 2003/0020671 | A1* | 1/2003 | Santoro et al. ................ 345/1.3 |
| 2003/0055868 | A1* | 3/2003 | Fletcher et al. .............. 709/201 |
| 2003/0055878 | A1* | 3/2003 | Fletcher et al. .............. 709/203 |
| 2003/0056026 | A1 | 3/2003 | Anuff et al. |
| 2003/0059009 | A1 | 3/2003 | Meyerson et al. |
| 2003/0065827 | A1 | 4/2003 | Skufoa et al. |
| 2003/0117437 | A1* | 6/2003 | Cook et al. ................... 345/764 |
| 2003/0126558 | A1* | 7/2003 | Griffin ........................ 715/513 |
| 2003/0137538 | A1 | 7/2003 | Hesmer et al. |
| 2003/0145275 | A1* | 7/2003 | Qian et al. .................... 715/500 |
| 2003/0167315 | A1* | 9/2003 | Chowdhry et al. ........... 709/218 |
| 2003/0167351 | A1* | 9/2003 | Hauser et al. ................. 709/318 |
| 2004/0002944 | A1 | 1/2004 | Hauser et al. |
| 2004/0059705 | A1 | 3/2004 | Wittke et al. |
| 2004/0104931 | A1* | 6/2004 | Schmitt ........................ 345/744 |
| 2004/0113948 | A1* | 6/2004 | Shahrbabaki et al. ........ 345/777 |
| 2004/0123238 | A1* | 6/2004 | Hefetz et al. ................. 715/513 |
| 2004/0133660 | A1 | 7/2004 | Junghuber et al. |
| 2004/0148586 | A1 | 7/2004 | Gilboa |
| 2004/0199392 | A1 | 10/2004 | Khatri et al. |
| 2004/0230901 | A1 | 11/2004 | Godwin et al. |
| 2004/0254884 | A1 | 12/2004 | Haber et al. |
| 2004/0261032 | A1* | 12/2004 | Olander et al. ............... 715/747 |
| 2005/0065913 | A1* | 3/2005 | Lillie et al. ....................... 707/3 |
| 2005/0065953 | A1 | 3/2005 | Bower et al. |
| 2005/0071853 | A1* | 3/2005 | Jones et al. ................... 719/328 |
| 2005/0102429 | A1 | 5/2005 | Pinhas et al. |
| 2005/0154719 | A1* | 7/2005 | Choudhary et al. .............. 707/3 |
| 2005/0154986 | A1* | 7/2005 | Bartek et al. ................. 715/714 |
| 2005/0187978 | A1* | 8/2005 | Qian et al. ................. 707/104.1 |
| 2005/0193001 | A1 | 9/2005 | Shoham |
| 2005/0198042 | A1 | 9/2005 | Davis |
| 2005/0198196 | A1* | 9/2005 | Bohn et al. .................... 709/217 |
| 2005/0198201 | A1* | 9/2005 | Bohn et al. .................... 709/218 |
| 2005/0198648 | A1 | 9/2005 | Wray et al. |
| 2005/0246632 | A1 | 11/2005 | Guido et al. |
| 2006/0031222 | A1 | 2/2006 | Hannsmann |
| 2006/0031849 | A1* | 2/2006 | Barta et al. ................... 719/320 |
| 2006/0080612 | A1* | 4/2006 | Hayes et al. .................. 715/742 |
| 2006/0271844 | A1 | 11/2006 | Suklikar et al. |
| 2007/0082707 | A1* | 4/2007 | Flynt et al. ................... 455/564 |
| 2008/0270929 | A1* | 10/2008 | Bohn et al. .................... 715/772 |
| 2009/0044152 | A1* | 2/2009 | Bohn et al. .................... 715/854 |
| 2009/0144376 | A1* | 6/2009 | Moscatelli et al. ........... 709/206 |

OTHER PUBLICATIONS

"Microsoft Management Console: Overview", Microsoft Corporation, Oct. 7, 1999, printed Nov. 18, 2003, <http://www.microsoft.com/windows2000/techinfo/howitworks/management/mmcover.asp> (2 pages).

"Microsoft Management Console: Overview; White Paper", Microsoft Corporation, Redmond, WA, 1999 (55 pages).

Hansen, Tony, On BRM Framework, Technical White Paper, Oct. 15, 2003, 89 pages.

C. S. Yang, M. Y. Luo, Design and Implementation of an Administration System for Distributed Web Server; Proceedings of the Twelfth Systems Administration Converence (LISA '98) Boston, Massachusetts, Dec. 6-11, 1998.

Budi Darmawan, Bart Jacob, Edson Manoel, Ebrahim Rahim, Baswa Shaker Shamshabad, IBM Tivoli Monitoring for Databases; IBM Redbooks 2002.

Lin, Hwa-Chun et al., "Distributed Network Management by HTTP-Based Remote Invocation", Global Telecommunications Conference, Rio de Janeiro, Dec. 5-9, 1999, GLOBECOM '99: Seamless Interconnection for Universal Services (pp. 1889-1893).

Rowley, Ian, "SCADA and the Internet", SCADA towards 2001, Bi-Annual Symposium and Exhibition on SCADA, Gatwick, UK, Jun. 5, 1997, Proceedings (pp. 1-15).

Joseph A. Bohn et al., U.S. Appl. No. 10/795,007, filed Mar. 5, 2004, Office Action, Jun. 5, 2007, 11 pages.

Joseph A. Bohn et al., U.S. Appl. No. 10/795,007, filed Mar. 5, 2004, Office Action, Nov. 20, 2007, 14 pages.

Joseph A. Bohn et al., U.S. Appl. No. 10/795,007, filed Mar. 5, 2004, Advisory Action, Feb. 13, 2008, 3 pages.

Joseph A. Bohn et al., U.S. Appl. No. 10/795,007, filed Mar. 5, 2004, Examiner Interview Summary, Jun. 13, 2008, 1 page.

Joseph A. Bohn et al., U.S. Appl. No. 10/795,007, filed Mar. 5, 2004, Notice of Allowance, Jun. 13, 2008, 6 pages.

Joseph A. Bohn et al., U.S. Appl. No. 10/795,008, filed Mar. 5, 2004, Office Action, Jun. 1, 2007, 12 pages.

Joseph A. Bohn et al., U.S. Appl. No. 10/795,008, filed Mar. 5, 2004, Office Action, Nov. 16, 2007, 14 pages.

Joseph A. Bohn et al., U.S. Appl. No. 10/795,008, filed Mar. 5, 2004, Office Action, Apr. 9, 2008, 21 pages.

Joseph A. Bohn et al., U.S. Appl. No. 10/795,008, filed Mar. 5, 2004, Examiner Interview Summary, Jun. 23, 2008, 2 pages.

Joseph A. Bohn et al., U.S. Appl. No. 10/795,008, filed Mar. 5, 2004, Notice of Allowance, Oct. 10, 2008, 7 pages.

Velda Bartek et al., U.S. Appl. No. 10/754,375, filed Jan. 9, 2004, Office Action, Dec. 5, 2006, 13 pages.

Velda Bartek et al., U.S. Appl. No. 10/754,375, filed Jan. 9, 2004, Office Action, Apr. 16, 2007, 14 pages.

Velda Bartek et al., U.S. Appl. No. 10/754,375, filed Jan. 9, 2004, Office Action, Oct. 3, 2007, 16 pages.

Velda Bartek et al., U.S. Appl. No. 10/754,375, filed Jan. 9, 2004, Office Action, Jun. 9, 2008, 17 pages.

Velda Bartek et al., U.S. Appl. No. 10/754,375, filed Jan. 9, 2004, Examiner's Answer, Oct. 15, 2008, 18 pages.

Samar Choudhary et al., U.S. Appl. No. 10/875,971, filed Jun. 24, 2004, Office Action, Nov. 16, 2006, 10 pages.

Samar Choudhary et al., U.S. Appl. No. 10/875,971, filed Jun. 24, 2004, Office Action, May 15, 2007, 14 pages.

Samar Choudhary et al., U.S. Appl. No. 10/875,971, filed Jun. 24, 2004, Office Action, Dec. 4, 2007, 15 pages.

Samar Choudhary et al., U.S. Appl. No. 10/875,971, filed Jun. 24, 2004, Examiners Answer, Jul. 2, 2008, 18 pages.

Samar Choudhary et al., U.S. Appl. No. 10/875,971, filed Jun. 24, 2004, BPAI Decision, Jan. 25, 2010, 14 pages.
Velda Bartek et al., U.S. Appl. No. 10/754,375, filed Jan. 9, 2004, BPAI Decision, Sep. 28, 2010, 9 pages.
Velda Bartek et al., U.S. Appl. No. 10/754,375, filed Jan. 9, 2004, Notice of Allowance, Oct. 7, 2010, 6 pages.
Samar Choudhary et al., U.S. Appl. No. 10/875,971, filed Jun. 24, 2004, Notice of Allowance, Apr. 15, 2010, 6 pages.
Joseph A. Bohn et al., U.S. Appl. No. 12/168,784, filed Jul. 7, 2008, Notice of Allowance and Examiner's Interview Summary, Dec. 13, 2010, 8 pages.
Joseph A. Bohn et al., U.S. Appl. No. 12/258,455, filed Oct. 27, 2008, Office Action, Oct. 11, 2011, 9 pages.
Joseph A. Bohn et al., U.S. Appl. No. 12/258,455, filed Oct. 27, 2008, Notice of Allowance, Nov. 21, 2011, 8 pages.

* cited by examiner

FIG. 5

```
                                                        510
<page uid="com.ibm.isc.samples.layout.2colsw2rows_pg"
520      launchPortletColumns="2">
   <title locale="en">Two Columns with Rows</title>
   <!--                                                 -->
   <!-- This page layout has two columns.  Each         -->
   <!-- column contains two rows.                       -->
   <!--                                                 -->
   <!--    _____                                      -->
   <!--   | A | C |                                     -->
   <!--   |___|___|                                     -->
   <!--   | B | D |                                     -->
   <!--   |___|___|                                     -->
   <!--                                                 -->

<row>
         <column>
            <row>
               <portlet
               ref="com.ibm.isc.samples.layout.A_Portlet"/>
            </row>
            <row>
               <portlet
               ref="com.ibm.isc.samples.layout.B_Portlet"/>
            </row>
         </column>
         <column>
            <row>
               <portlet
               ref="com.ibm.isc.samples.layout.C_Portlet"/>
            </row>
            <row>
               <portlet
               ref="com.ibm.isc.samples.layout.Graphical_Portlet"/>
            </row>
         </column>
      </row>

```xml
<?xml version="1.0" encoding="UTF-8"?>
<component xmlns:xsi="http://www.w3.org/2001/XMLSchema-instance"
xsi:noNamespaceSchemaLocation="isc.xsd" uid="com.ibm.isc.samples.LaunchServiceDemo"
version="1.0" suiteID="suite.ISC" suiteversion="5.0">
    <component-title>
        <title locale="en">LaunchServiceDemo</title>
    </component-title>
    <suite-title>
        <title locale="en">Integrated Solutions Console Samples</title>
    </suite-title>
    <content-hierarchy>
        <content-type name="workItemPage" supported-markup="html" >
            <org-node uid="com.ibm.isc.samplesNode">
                <title locale="en">Samples</title>
            <org-node uid="com.ibm.isc.samplesNode.LSDNode" >
                <title locale="en">Launch Service Samples</title>
                  ⟵ 1216
                    <title locale="en">Launch Service Demo</title>

<row>
                            <portlet ref="com.ibm.isc.samples.LaunchServiceDemo.cpuid.LaunchSvcDemo1"/>  ⟵ 1212
                            <portlet ref="com.ibm.isc.samples.LaunchServiceDemo.cpuid.LaunchSvcDemo2"/>  ⟵ 1214
                        </row>

⟵ 1210
            </org-node>
            </org-node>
        </content-type>
```

FIG. 12B 1200 (cont'd)

```
<content-type name="launchedPage" supported-markup="html">
            ⎤ 1234
    <title locale="en">Echo LSD Sample</title>             ⎥
                                              ⎥
      <row>                                                ⎥
        <portlet ref="com.ibm.isc.samples.LaunchServiceDemo.cpuid.LSDEcho"/>  1232
      </row>                                               ⎥
                                             ⎥
                                                    ⎦ 1230
</content-type>
</content-hierarchy>
</component>
```

USER TASK INTERFACE IN A WEB APPLICATION

RELATED INVENTIONS

The present invention is related to the inventions disclosed in the following commonly-assigned U.S. patent applications Ser. No. 10/795,008 (now U.S. Pat. No. 7,493,563), entitled "Using Content Aggregation to Build Administration Consoles", which was filed on Mar. 05, 2004; Ser. No. 10/795,007 (now U.S. Pat. No. 7,444,633), entitled "Federating Legacy/Remote Content into a Central Network Console", which was filed on Mar. 05, 2004; and Ser. No. 10/754,375, entitled "Dynamic Composition of Help Information for an Aggregation of Applications", which was filed on Jan. 9, 2004.

BACKGROUND OF THE INVENTION

1. Field of the Invention

The present invention relates to computing systems, and deals more particularly with techniques for providing a task interface for users of Web-accessible applications, such as console applications.

2. Description of the Related Art

Computer software and hardware systems are often configured, monitored, and managed by one or more administrators using graphical user interfaces called "consoles". Often, each system component within an information technology ("IT") environment has its own independently-developed console for carrying out these operations. Even a relatively small business can require a number of different computer-based products (including hardware components and/or software components) for its business solution, and a large business or other enterprise may have a very large number of such products in its IT environment.

A number of problems with prior art consoles have been described in the related inventions titled "Using Content Aggregation to Build Administration Consoles" (U.S. Pat. No. 7,493,563) and "Federating Legacy/Remote Content into a Central Network Console" (U.S. Pat. No. 7,444,633), and solutions to those problems are described therein.

A problem not addressed in the related inventions is that Web-based consoles have been limited in their capabilities because of the lack of a standard, shareable infrastructure to support task-based user interfaces. Task-based user interfaces are quite common today in desktop computing environments and operating systems based on a windowing paradigm where a window is created to represent each active user task. Applications could build their own task-based mechanism, but that is analogous to having to build both the application user interface and the desktop user interface within the application. This build-your-own approach also does not facilitate interactions among application user interfaces or the ability to easily switch from a task in one user interface to a task in another user interface without loss of data, both of which are features that users expect to be present in desktop computing environments.

Without a task-based user interface for Web-based consoles, it may be difficult for users of those consoles to achieve optimum productivity levels. The need for task-based Web user interfaces is not restricted to administration consoles, however. For example, some applications such as word processors may be presented as Web applications. As in a desktop computing environment, a user can be productive if he can manage different instances of the word processor application for different documents that he switches between. Accordingly, what is needed are improvements that provide task-based user interface features in Web-based applications.

SUMMARY OF THE INVENTION

An object of the present invention is to provide task-based user interface features in Web based applications.

Another object of the present invention is to provide techniques that enable users of Web-based user interfaces to have multiple instances of a particular activity in progress at any given time, with independent state information maintained for each instance.

A further object of the present invention is to enable users of Web-based applications to be interrupted from a first activity to switch to a second activity, without losing state when later returning to the first activity.

Still another object of the present invention is to provide techniques that enable activities carried out in a Web-based application to have a life cycle with a definite beginning and end.

Yet another object of the present invention is to provide users with a capability for persisting custom tasks comprised of dynamically-built aggregated content and contextual information.

A further object of the present invention is to enable users to launch a task from a task-based user interface and programmatically pass contextual information to the launched task.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be deployed as methods, systems, and/or computer program products embodied on one or more computer-readable media. In one aspect, the present invention provides a task-based interface for a Web-based application by creating a new instance of a work unit for which a rendered view is requested, where the view comprises content renderable by one or more content-creating software entities; and associating state information with the new instance, thereby enabling one or more additional instances of the work unit to be created, each maintaining its own independent version of the associated state information. Creating the new instance and associating the state information may be repeated for one or more distinct work units.

An entry representing each of the instances is preferably rendered in a user interface control, such that any of the instances can be viewed by selecting its rendered entry. The user interface presents a view of a particular work unit, and the view of the particular work unit is preferably overlaid with a view rendered by the newly-created instance.

Content may be added dynamically to the new instance, wherein the dynamically-added content is created by a dynamically-selected content-creating software entity.

With the creation of a work unit or dynamically-added content, contextual information may be passed as well so that the content may be rendered in context of the current activity. After the initial presentation of content, the contextual information may be refreshed to permit the rendering in a new context.

A user may close a view associated with any of the distinct work units or the new instance or additional instances thereof, while retaining the associated state information for the work units not being closed. In addition or instead, the user may remove the dynamically-added content from the new instance.

The new instance, its associated state information, and contextual information for its content-creating software entities may be persisted (at least temporarily) for subsequent recall.

The present invention will now be described with reference to the following drawings, in which like reference numbers denote the same element throughout.

BRIEF DESCRIPTION OF THE DRAWINGS

FIGS. 5 and 12 (comprising FIGS. 12A-12B) provide sample XML documents illustrating syntax that may be used with preferred embodiments of the present invention to enable adding content from dynamically-launched portlets to a work unit view;

DESCRIPTION OF PREFERRED EMBODIMENTS

Figure 1:
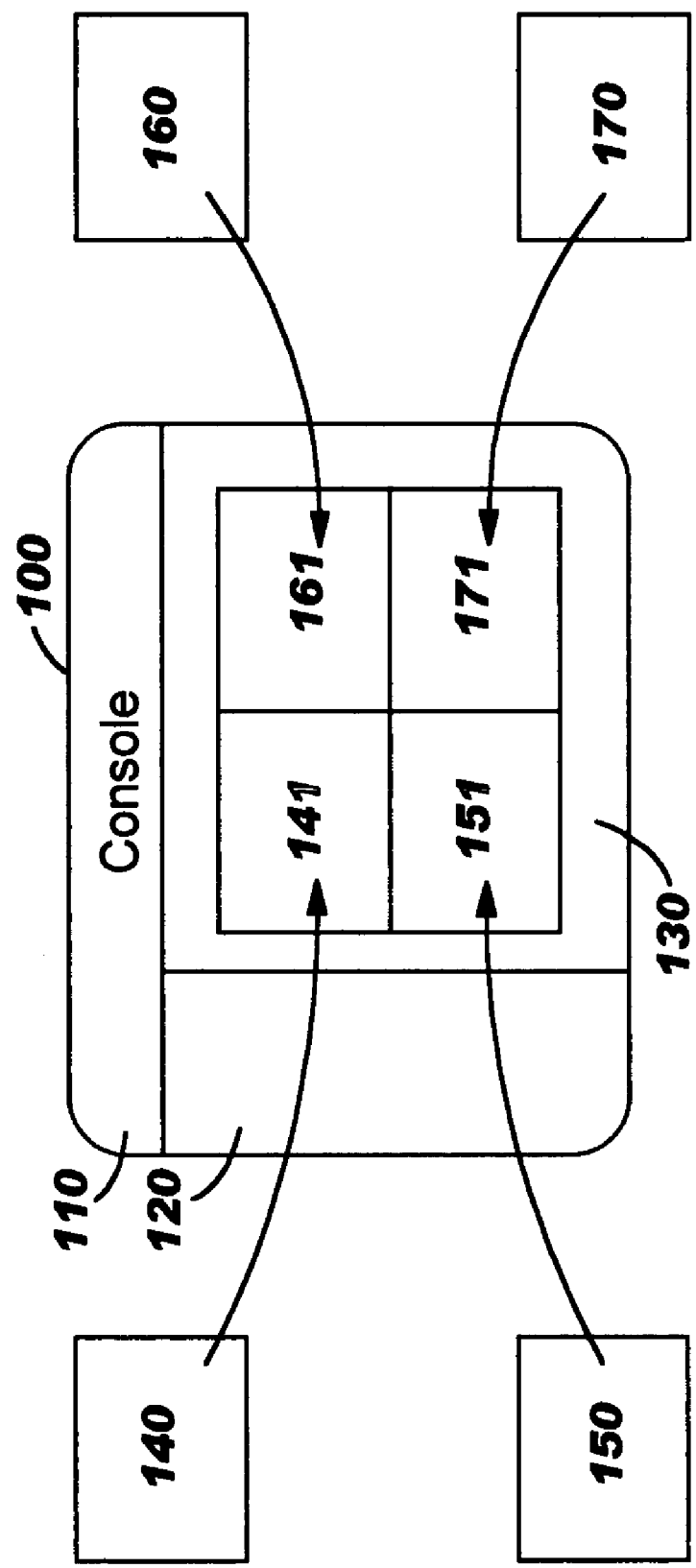
FIG. 1 illustrates, in an abstract manner, a Web-based user interface as a console having an aggregated content view, and is used when describing a task-based user interface according to techniques of the present invention.

Preferred embodiments of the related invention titled "Using Content Aggregation to Build Administration Consoles" (U.S. Pat. No. 7,493,563, also referred to herein as "the content aggregation invention") provide a solution-based approach to IT administration, whereby content can be flexibly arranged to provide a content view that is adapted for the IT solution deployed in a particular IT environment. In one disclosed approach, portal technology is used as the content aggregation framework and portlets are used for creating content. (Alternatively, other approaches such as "struts and tiles" may be used. Struts is a framework for building Java® Web applications, and was created as part of the Apache Jakarta Project that is sponsored by the Apache Software Foundation. Refer to the Apache Web site or publications for more information. "Java" is a registered trademark of Sun Microsystems, Inc. in the United States, other countries, or both.) Preferred embodiments of this related invention deploy an administration console as a Web-accessible application, and this console consolidates the administration interfaces for an arbitrary set of management operations, including administration of an arbitrary collection of hardware and/or software resources. Roles/permissions may be used when rendering content for the console, and views may be customized for individual end users (or user groups).

Preferred embodiments of the related invention titled "Federating Legacy/Remote Content into a Central Network Console" (U.S. Pat. No. 7,444,633, also referred to herein as "the federation invention") aggregate content from multiple remote/legacy consoles within a central console to provide a single point-of-access for managing remote and/or legacy resources. Preferred embodiments deploy the central console as a network-accessible application, and this console application communicates with remotely-located console applications (and/or other locally-executing functions) that carry out tasks selected from the central console by an administrator and then return content generated by those tasks for rendering in the central console. The run-time environment used at the central console is not required to match the run-time environment of the remote/legacy consoles when using preferred embodiments of this related invention.

The related invention titled "Dynamic Composition of Help Information for an Aggregation of Applications" (U.S. patent application Ser. No. 10/754,375) discloses techniques for aligning the presentation of help information (or other information) with the presentation of content for which help may be requested.

While these related inventions provide a number of advantages, they do not disclose a task-based user interface as disclosed herein. (Techniques disclosed in one or more of the related inventions may optionally be used in combination with embodiments of the present invention.) Preferred embodiments of the present invention will now be described.

A task-based user interface as disclosed herein provides several important capabilities to a user, including (but not limited to): the ability to have multiple instances of a particular activity or task in progress at any given time, with independent state information maintained for each instance; the ability to be interrupted from one activity without losing its state upon later returning to the activity; the ability to quickly switch between tasks (without losing task-specific state); the ability to programmatically launch a new task from within a rendered view (e.g., responsive to a user's selection or activity), and to optionally pass contextual information to the new task upon its launch; the ability to close a task upon completion of an activity; the ability to release resources allocated to an activity when the activity is complete; and/or the ability to release allocated resources when a user session ends.

A task-based user interface becomes increasingly important as users change from occasional use of Web-based applications to full-time use, as will be the case for administrators who work in IT environments where a Web-based administration console is deployed. Such increased usage brings higher expectations for capabilities to be provided by the user interface.

A task-based user interface will also be useful as more and more functions that are conventionally deployed in a desktop computing environment, such as document editors, are offered as Web applications in environments such as portals. Furthermore, a task-based user interface also provides a number of advantages for program developers, including the ability to free resources allocated to perform some activity when the activity is completed.

Preferred embodiments implement a task-like user interface as an extension to a portal infrastructure, such as WebSphere® Portal Server, a commercially-available product of International Business Machines Corporation ("IBM"). ("WebSphere" is a registered trademark of IBM in the United States, other countries, or both.) Use of a portal infrastructure such as WebSphere Portal Server for deploying administration consoles was disclosed in the content aggregation invention.

The content aggregation invention discloses using WebSphere Portal Server when creating and presenting a navigation hierarchy where each entry represents a separate invocable portal page. However, without a tasking interface as disclosed herein, a user is not able to terminate a task once it has been invoked, and without this definite termination point, it may be quite difficult for a programmer to identify an event upon which the task's allocated resources can safely be released. Systems that leverage prior art portal page technology also do not provide an ability to launch multiple instances of a task, with independent state maintained for each. Furthermore, systems that leverage prior art portal page technology do not provide the ability to dynamically alter the content of a page or work unit based upon a user's action when processing a task (such as launching a new portlet onto the current page).

Preferred embodiments of the present invention, by contrast, provide an integrated capability within a content aggregation framework for launching new tasks. In one approach, new tasks are launched for each selection from a navigation pane. (Optionally, a singleton capability may be provided as an exception. Singletons are described in more detail below, with reference to FIG. 11.) Preferred embodiments build a new instance, also referred to herein as a clone, of the portal page associated with each task selected by the user. Thus, if the user selects a particular task from the navigation pane multiple times, then a new clone of the portal page for that task is automatically created responsive to each selection, and state is maintained independently for each of these clones. The user can therefore switch between the clones (or switch to a representation of a completely different task), and upon returning, will see a view based on the state information of the returned-to clone.

Furthermore, preferred embodiments of the present invention enable extending aggregated page content with dynamically-launched portlets based upon user or programmatic actions. For example, a page that contains content for an event view might provide a mechanism to display further detailed information about a selected event. This can be accomplished with an embodiment of the present invention by launching a new portlet instance onto the aggregated page content, where this new portlet instance provides further details about the currently-selected event. This new content is then maintained as part of the state for this task (and will not affect the state of other event view work units).

Preferred embodiments are described herein with reference to using Web portals as a content aggregation framework, and using portlets for creating content that is to be rendered in a Web-based console. It should be noted, however, that references herein to using portals or portlets are by way of illustration and not of limitation. Alternatively, a different framework and/or different types of content-creating software entities may be used, without deviating from the scope of the present invention. As one example, a "struts and tiles" approach may be used to provide the framework and the content, as in the content aggregation invention. As another example, servlets may be used for generating content. Furthermore, while examples presented herein depict a Web-based console application, this is by way of illustration and not of limitation: techniques of the present invention may be used advantageously to provide a task-based user interface without regard to the purpose for which the content in that interface is created.

FIG. 1 abstractly illustrates a sample Web page 100, representing a Web-based user interface as a console (see title bar 110) that is representative of an application in which preferred embodiments of the present invention may operate. As shown therein, the page also contains a navigation pane 120, where available tasks are preferably rendered (for example, as text that can be selected to cause execution of a work unit corresponding to the selected task), and a work area 130, where content pertaining to a selected task is preferably rendered. In the work area 130 of sample page 100, content in four separate subareas or cells 141, 151, 161, 171 is arranged in two columns and two rows. FIG. 1 also shows four sample portlets 140, 150, 160, 170 that execute to create the content of these cells. The portlets might use prior art techniques to query the status of hardware devices or software applications, for example, and prior art techniques may be used to create content for rendering in individual ones of the cells to reflect that current status. (Techniques of the present invention may be used to create multiple instances of the aggregated view, or to temporarily overlay work area 130 with content pertaining to a different task, and so forth, as will be described in more detail herein.) As disclosed in the related inventions, instructions written in a markup language such as XML are preferably used to specify how content is to be arranged into pages and also to specify how entries are to be added to navigation pane 120.

Figure 2:
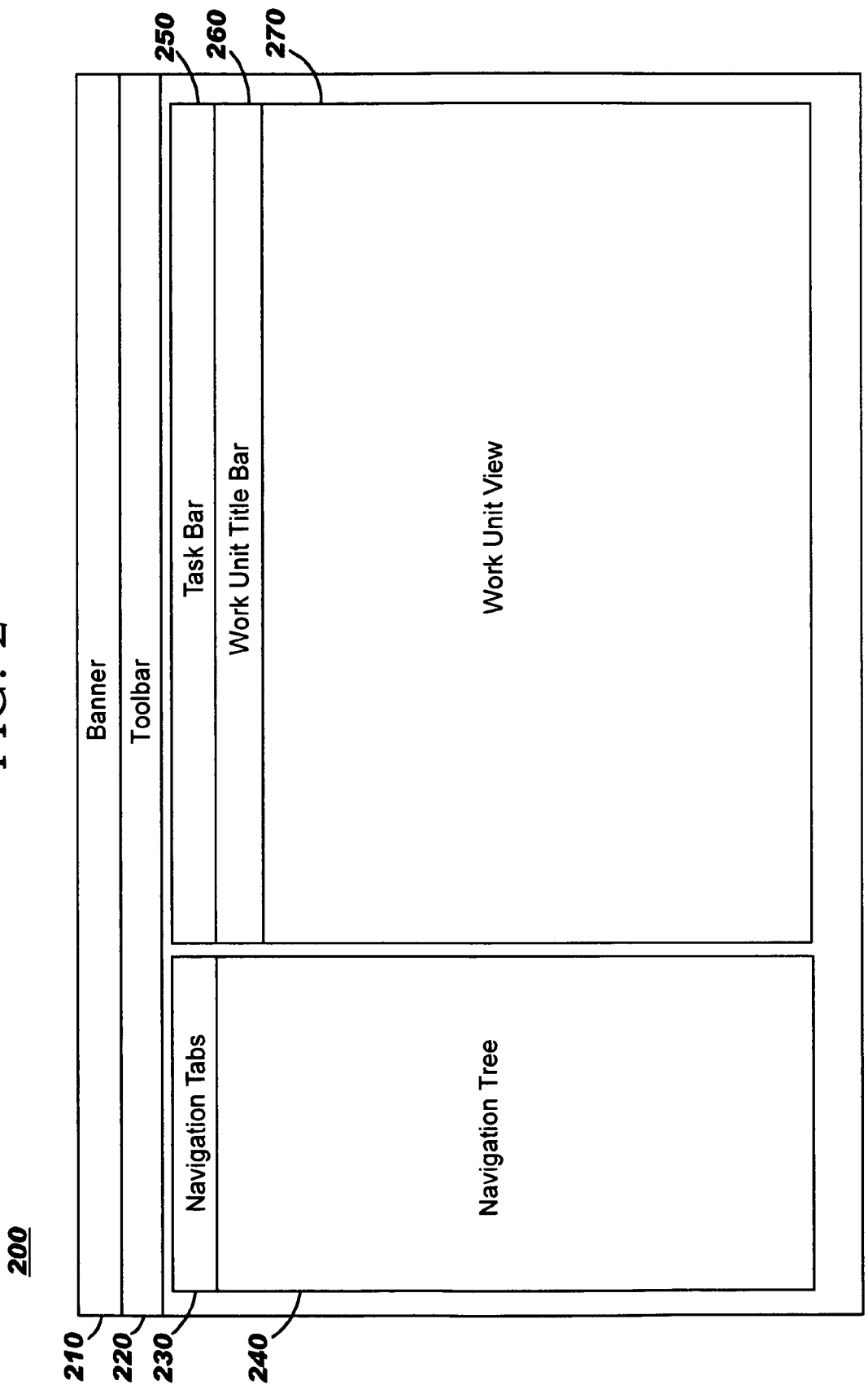
FIGS. 2-4 provide abstract representations of user interface layouts used by preferred embodiments.

More generally, FIG. 2 shows a page layout 200 used by preferred embodiments of the present invention. A banner area 210 may be used to provide a title for the Web-based application, and a toolbar 220 may provide a number of selectable tools (such as iconic representations of "File", "Print", and so forth). One or more navigation tabs may be provided at 230, for use with navigation pane 240. As disclosed in the content aggregation invention, navigation tabs may be used to group user interface functionality, and representative tabs include "Work Items", "Status", and "Settings". Thus, the navigation pane 240 renders selectable tasks for the currently-active navigation tab.

The term "task-based user interface" or "task-based interface", as used herein, refers to an interface that permits the user to operate on individual activities as independent tasks. The user is permitted to initiate an activity, be interrupted from that activity, and then return to it without loss of the activity's state. User-initiated activities are also referred to herein as "tasks", and a view created by a task is preferably rendered in work area 130. One type of task corresponds to a portal page instance, and these tasks are also referred to herein as "work units". Thus, everything launched from the navigation pane is considered a work unit. (Another type of task is a portlet, which may be considered a task from the programmer's perspective. These tasks are referred to herein as portlets to eliminate confusion with user-initiated tasks, which may span more than one portlet. References hereinafter to tasks and work units are intended to be synonymous.)

To accommodate this task-based approach, work area 130 of FIG. 1 is further defined in FIG. 2 as having a task bar 250, a work unit title bar 260, and a work unit view 270. Each of these will now be described in more detail.

Task bar 250 is preferably positioned at the top of the group 250, 260, 270, and contains an entry for each currently-active task (except for singletons) in the user session. Preferably, a textual representation of each task's name is presented in these entries, and the task names may be shortened as necessary if display space is constrained. The names preferably operate as a type of hyperlink, whereby the user can immediately switch to the view of a different one of the tasks by selecting its name from the task bar. In addition, each entry preferably includes an indication that can be activated by the user to explicitly close that work unit. This is illustrated in FIG. 3 at reference number 300, where entries for four different tasks named "Task 1", "Task 2", "Task 3", and "Task 4" are presented.

Figure 3:
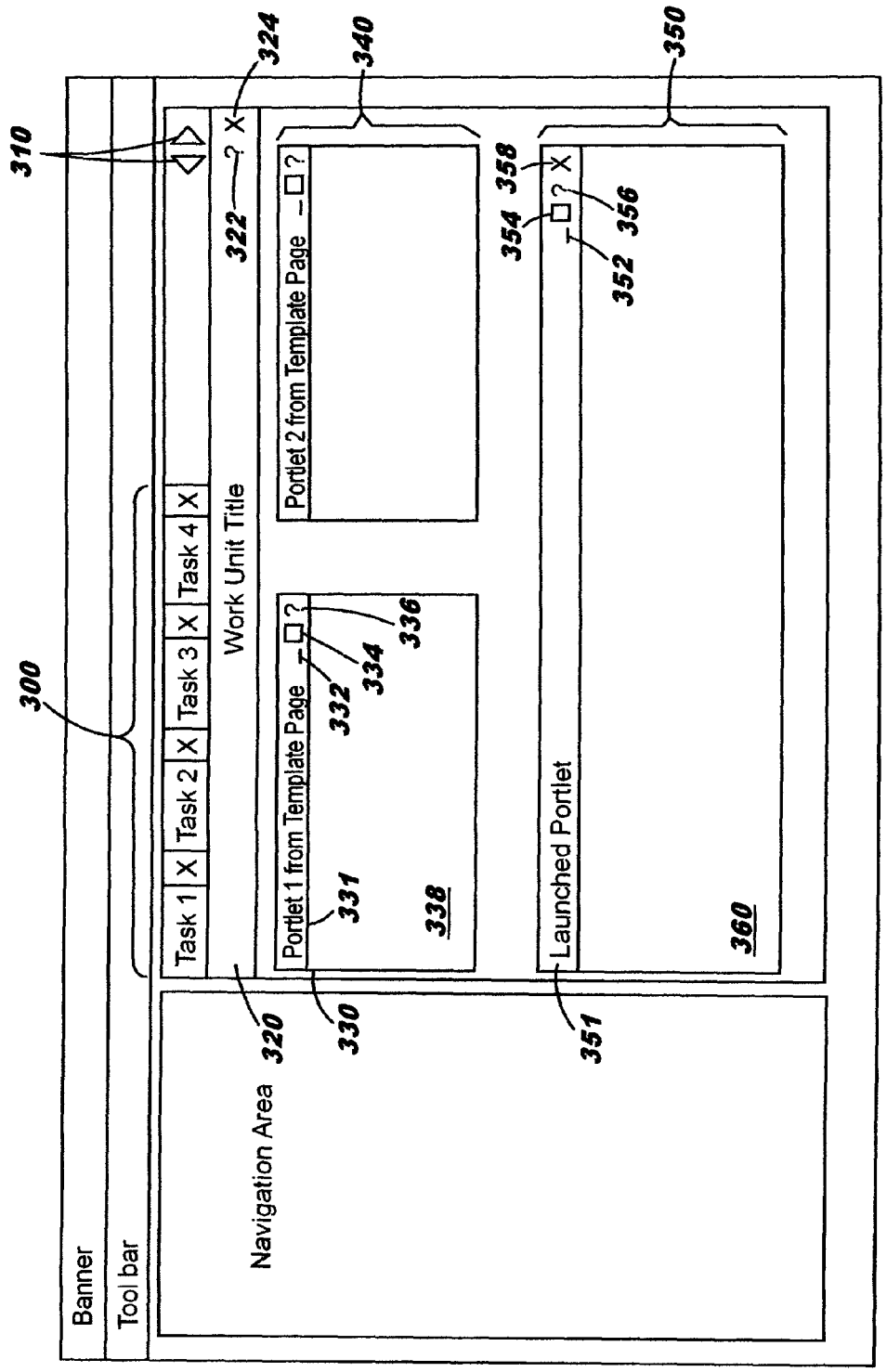

Preferably, the task entry associated with the currently-displayed work unit view is shown in a different graphical representation (e.g., using a different color, font, or highlighting), although this has not been shown in FIG. 3. Reference number 300 also shows that preferred embodiments display a selectable "X" in the task bar entry for each task: if the user clicks on the "X", then its associated task will be ended and the view of its work unit will be removed. (If the work unit to be closed is currently displayed, preferred embodiments replace that view with a view of the work unit that was visited last by this user.)

In preferred embodiments, tasks are transient in that they exist only for a user session or until a user chooses to terminate an invoked task. The entire set of tasks launched by the user during the user session are preferably presented to the user in an appropriate user interface control. FIG. 2 illustrates this user interface control as task bar 250, although alternative controls may be used without deviating from the scope of the present invention. Using this task bar, the user can easily switch between tasks at will. Preferably, entries in the task bar do not duplicate entries in the navigation pane. So, for example, if "Task 1" was presented as a selectable choice in the navigation pane and the user selected this task twice, two entries for this task would appear in the task bar (where these entries represent different instances of the task). The navigation pane therefore serves as a type of launching point for task instances.

The user can also terminate tasks at will when using preferred embodiments. Removing a task causes its associated view to be removed from the system and the entry for that view is also removed from the task bar. When a task is being terminated, the programs (i.e., portlets, in preferred embodiments) which are involved in the task are notified so that system resources can be released. (Similarly, when a task is being created, the programs are notified of task creation, enabling system resources to be allocated as necessary to facilitate task execution. This is discussed in more detail with reference to FIGS. 10-11 and 13.)

If the entries for active tasks presented on the task bar would exceed the available display space, preferred embodiments programmatically add task bar controls, shown in FIG. 3 at reference number 310 as left-right scroll indicators. (Preferably, these scroll indicators do not appear when the list of task names does not yet exceed the available space and is therefore not scrollable. Thus, FIG. 3 provides these indicators 310 merely for illustrative purposes.)

Each time a different work unit is selected for viewing, the currently-displayed work unit title and work unit view are preferably overlaid with those of the newly-selected work unit. The work unit title bar 260 of FIG. 2 is shown in more detail at reference number 320 in FIG. 3. Preferably, page-level help is provided for each work unit, and an indication 322 (shown in this example as a question mark, "?") of available help is provided in the work unit title bar. Upon activating this indication 322, techniques of the related invention titled "Dynamic Composition of Help Information for an Aggregation of Applications" may be invoked. User-selected work units also include an indication 324 that can be selected to close the currently-viewed work unit. As discussed above with reference to task entries in the task bar, if the user activates indication 324 to close a work unit, that work unit's view is removed and its entry is also removed from the task bar.

In preferred embodiments, a work unit view is structured as a layered container. Within a particular work unit view 270, content rendered by one or more portlets may be displayed. In the example of FIG. 3, three portlets 330, 340, and 350 render content for the work unit view. Preferably, the content rendered by each portlet also contains a title, as shown at reference number 331 for portlet 330 and reference number 351 for portlet 350. In addition, portlet controls are preferably provided. The types of portlet controls rendered for a particular portlet depend, in preferred embodiments, on whether the portlet formed part of the definition of the user-selected page or was dynamically selected by the user after that page was already displayed, as will now be discussed with reference to FIGS. 4 and 5.

Figure 4:
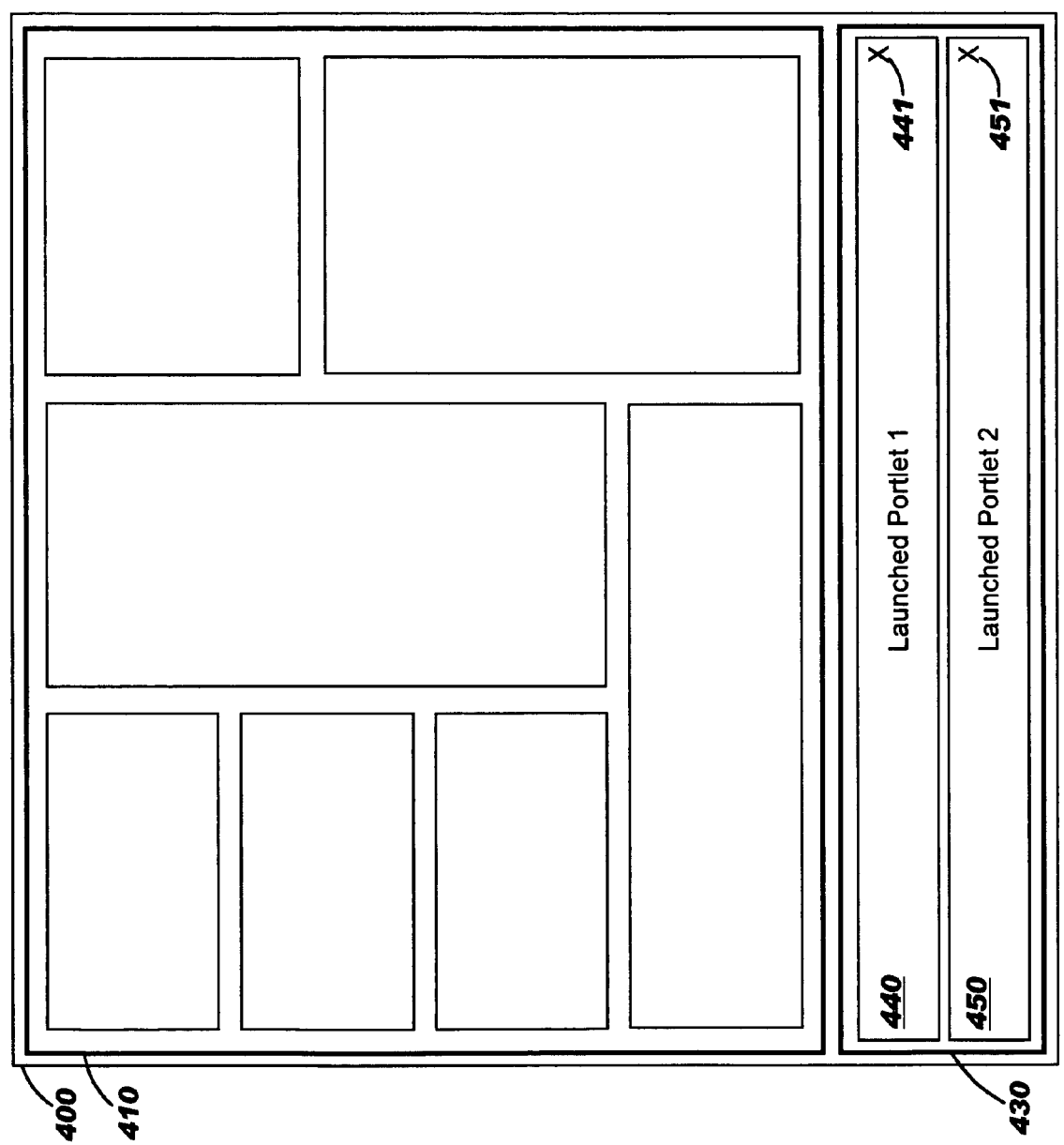

FIG. 4 illustrates, in an abstract manner, the concept of a "template page". According to preferred embodiments, the work unit view for each selectable task is defined using a template page. Preferably, the template page comprises an extension of the XML document illustrated in FIGS. 5 and 26 of the content aggregation invention, where information for the layout of an aggregated page and the roles, access rights, and filtering criteria associated therewith were defined. In this template page, a reference is specified for each portlet that is to be present (if available in this system and for this user) when the work unit view is initially rendered. An attribute of the page is added, according to preferred embodiments, to specify a number of columns to be used for rendering content from dynamically-selected portlets. Preferably, this number is restricted to a relatively low range, such as 1 to 3, and a default value of 1 is preferably used. (If it is desirable to always use a 1-column approach with an embodiment of the present invention, then this column attribute may be omitted.)

In the general case, template pages may be arbitrarily complex in their containment structure. A general-purpose means of adding dynamically-launched portlets is thereby provided, where the original page definition will be included in another container itself and a row containing the specified (or default) number of columns will be added below that container. Column containers at the bottom of the work unit view area will be the target containers for any dynamically-launched portlets. (Every page definition can be used as a template page and has the potential to include content from dynamically-launched portlets.) Thus, the outer boundary 400 in FIG. 4 corresponds to an outer container for the template page and a column container to be used for rendering any portlets launched from the work unit view provided by this instance of the template page. Boundary 410 surrounds a sample template page instance, which is preferably defined using nested containers. Boundary 430 surrounds a column container, which in this example is a 1-column container, and two portlets 440, 450 are shown therein as having been launched. Each of these launched portlets 440, 450 has an associated indication 441, 451 that can be selected by the user to explicitly close this portlet. Note that the portlets contained in template page 410 do not contain this type of indication: this is a difference between the portlet controls on dynamically-launched portlets and portlets which formed part of the original work unit definition, as discussed above. (A close indicator is provided for the entire work unit, preferably in the title bar, as shown at reference number 324 in FIG. 3.) As will be obvious, portlets can also programmatically decide to remove themselves from an executing task, as appropriate.

FIG. 5 provides sample XML syntax showing how column information of a representative template page instance, using a 2-column layout in this case, might be specified. (FIG. 12, discussed below, provides another example.) As show in FIG. 5, a "launchPortletColumns" attribute 520 is provided on a "" tag 510 and has a value of "2". When a portlet is dynamically launched, its content is then preferably rendered in the next available one of the columns, proceeding from one side to the other when using a multi-column layout. If content for an active portlet is displayed in one of these locations and the portlet is subsequently closed, content from any portlets located beneath the closed portlet are preferably automatically scrolled upward in that column. And, if the position into which content for a newly-launched portlet falls off the viewable portion of the work unit display area, the work unit area is preferably automatically scrolled upward so the user can see the content of the newly-launched portlet.

Figure 6:
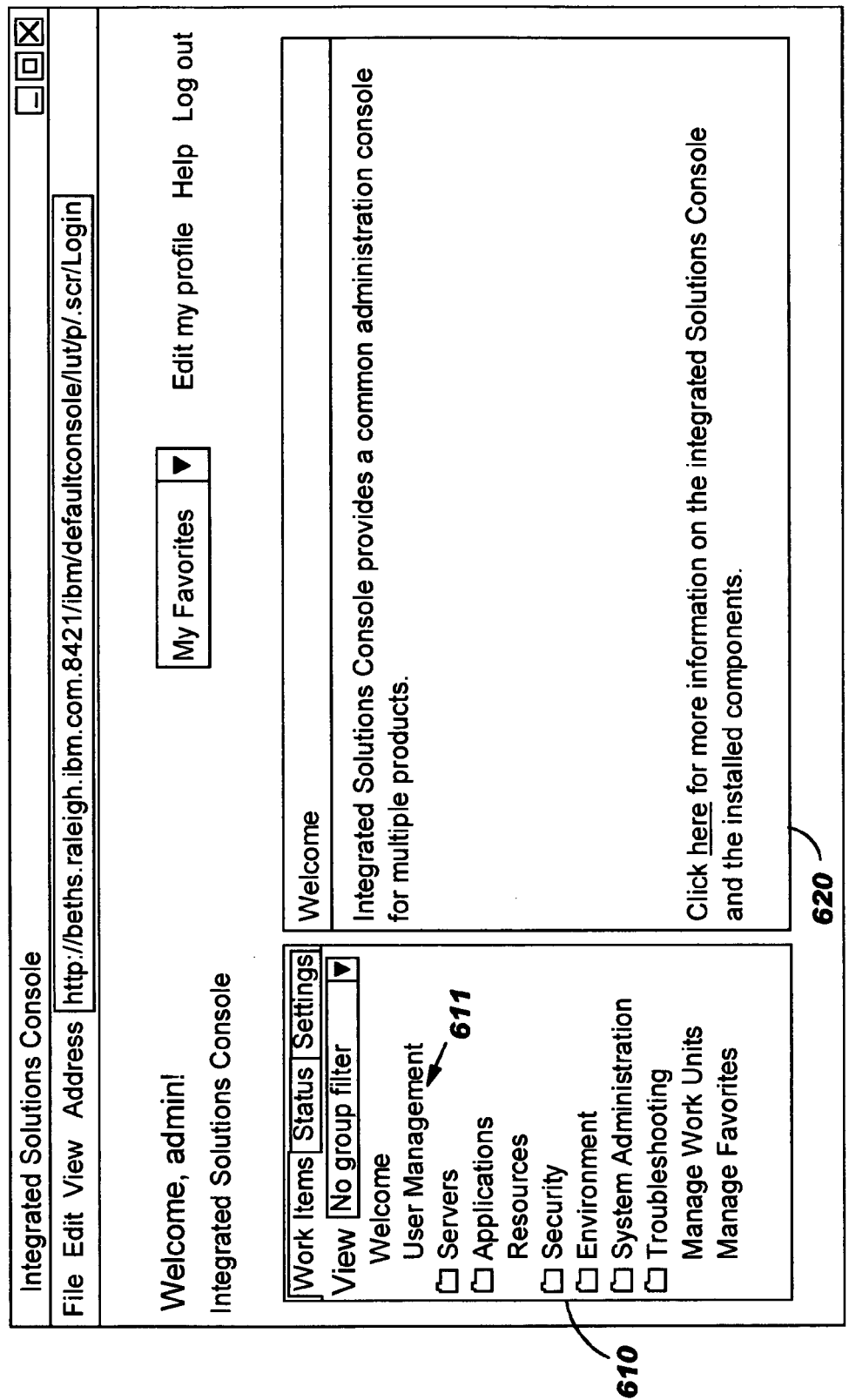
FIGS. 6-9 (comprising FIGS. 9A-9B) and 14 provide sample console views that are used to describe operation of the task-based user interface of preferred embodiments.
Figure 7:
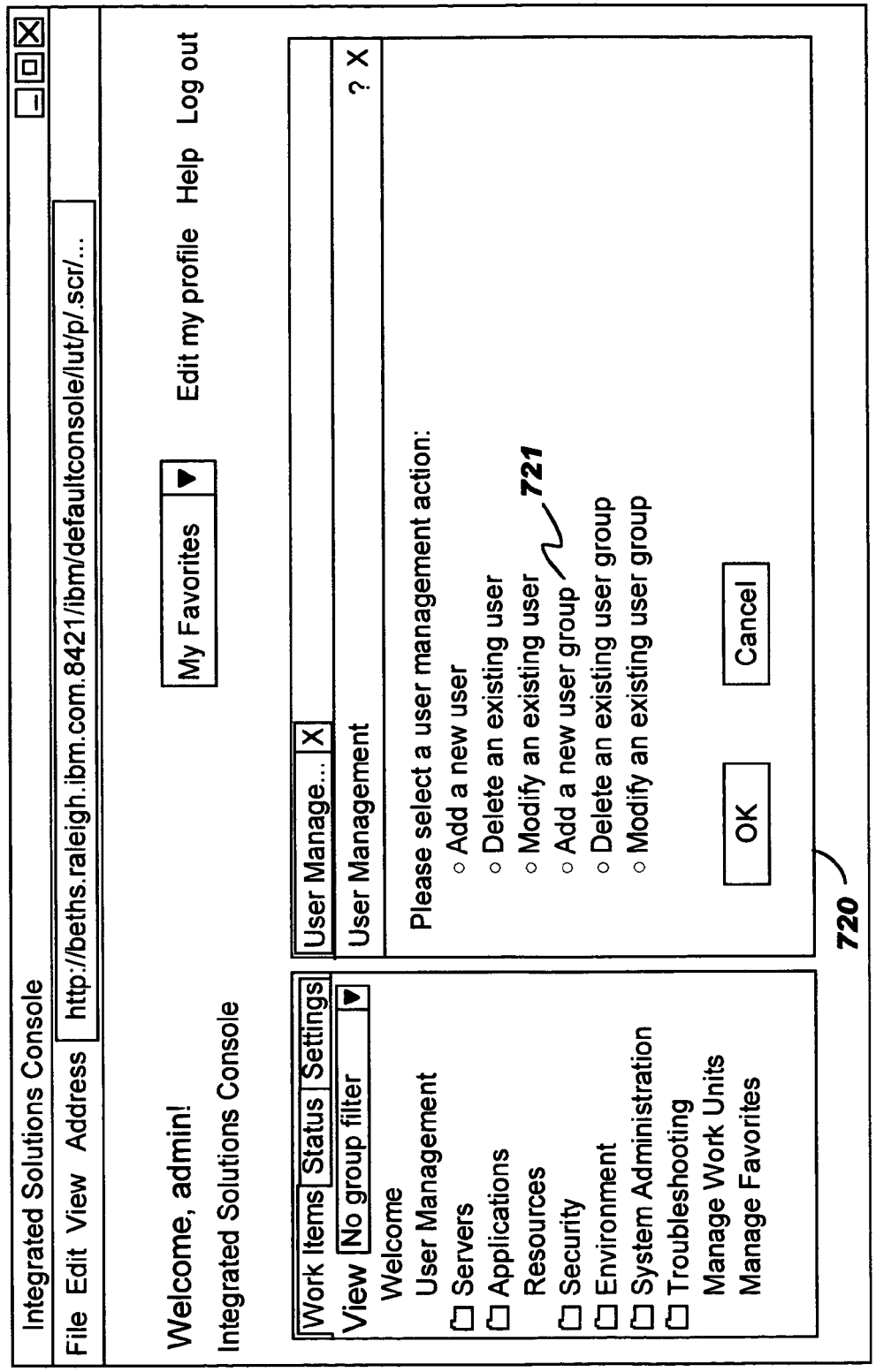

FIGS. 6-9 depict a simple scenario illustrating how a user may interact with a task-based user interface according to preferred embodiments. In FIG. 6, a sample "Welcome" page 600 is depicted, having a navigation pane 610 with a number of selectable tasks and a work area 620 for rendering a view of a selected task. Suppose the user selects the "User Management" task, which is represented at 611 in navigation pane 610, in order to provide information pertaining to a system user. A new task is therefore created for this User Management activity and a clone is made of the template page associated with the task (as discussed in more detail below with reference to FIG. 11). This new work unit then replaces the content of work area 620, as shown by the sample content at reference number 720 in FIG. 7, such that the user can now interoperate with this new task. As shown in FIG. 7, the task bar contains one entry representing this new task and the work unit view area shows a number of different actions that might be provided for the selected User Management task.

Figure 8:
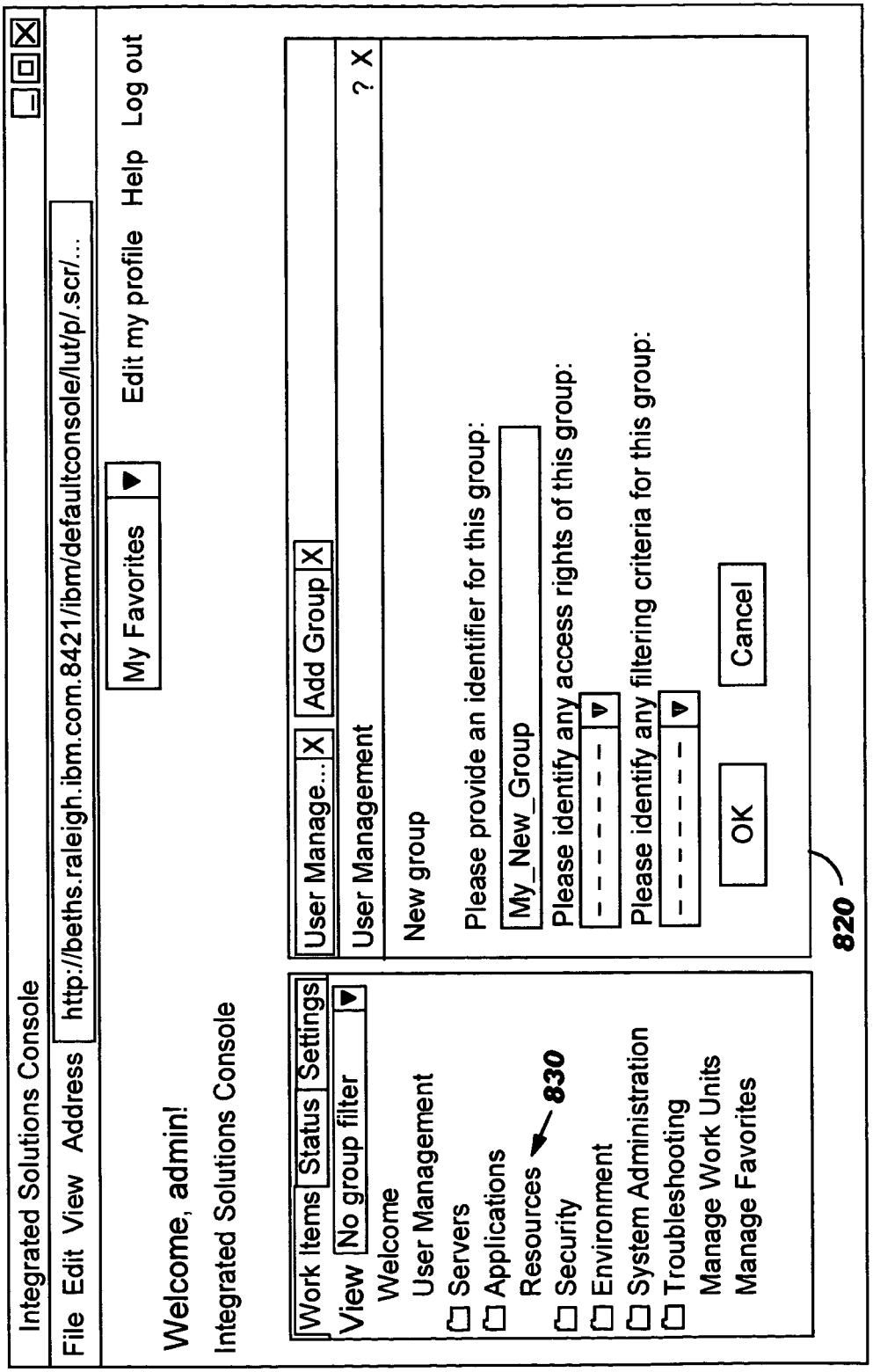

In addition to creating a new task instance responsive to selection of an entry in a navigation pane, embodiments of the present invention preferably enable any running portlet to programmatically launch a new task instance using functions made available in a portlet service. Suppose, for example, the user selects action 721 to add a new user group. A task may be launched for this action, and FIG. 8 shows how a sample work unit view 820 may then overlay work unit view 720, enabling the user to provide information for defining the new group. This new work unit provides entry means for several different types of group-level information, including a group identifier, group-level access rights, and group-level filtering criteria. (These choices are by way of illustration and not of limitation.) As shown in the sample view 820, the user has already entered a name for the new group, "My_New_Group", but has not selected any access rights or filtering criteria from the provided drop-down lists.

Figure 9A:
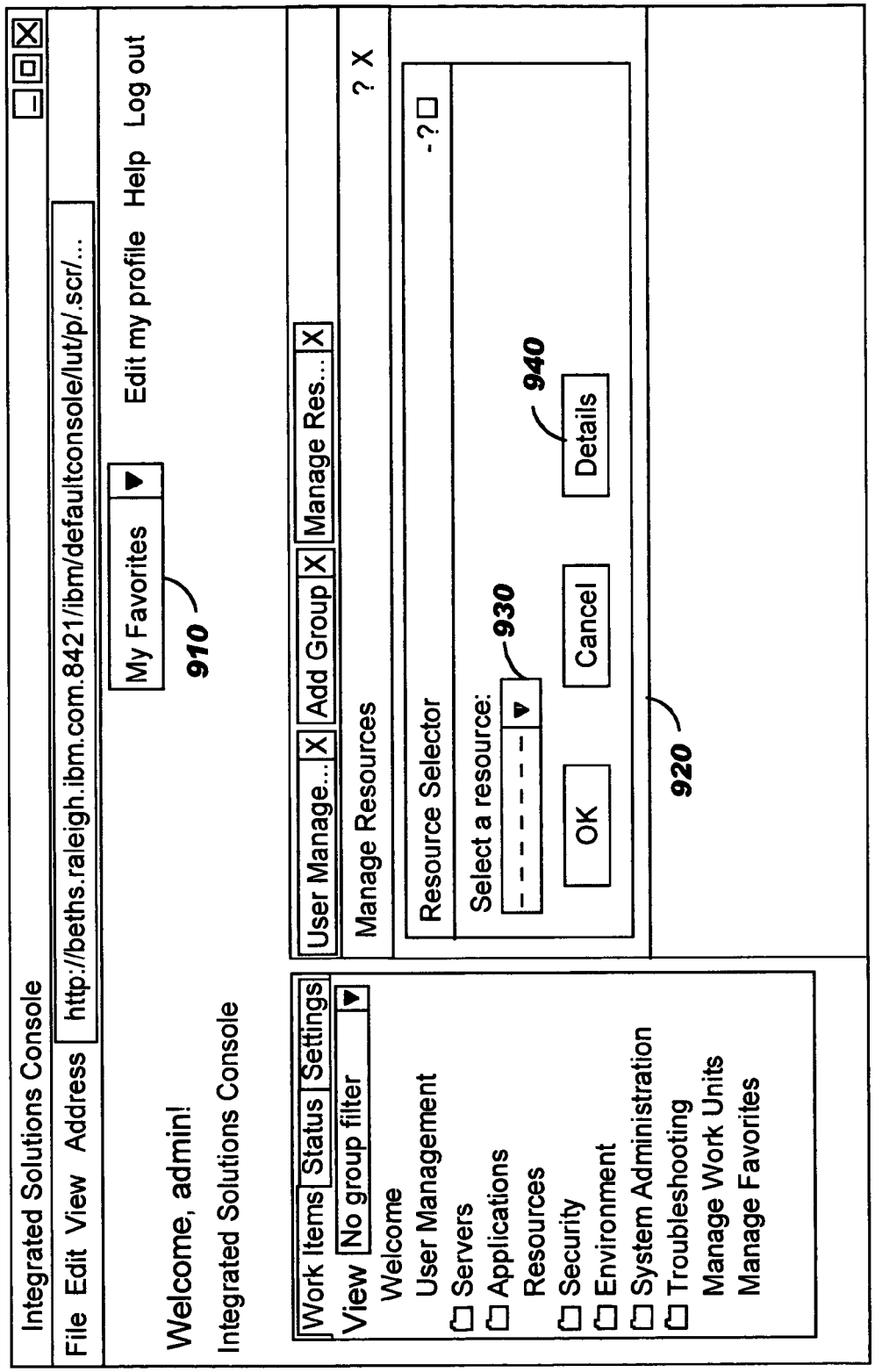

Now suppose that the user receives an urgent call inquiring about problems with a managed resource. The user can temporarily suspend working on the new user group and switch to monitoring the resource by selecting the navigation pane entry for "Resources" (see reference number 830). FIG. 9A shows how the work unit view 820 in FIG. 8 may be overlaid with a new work unit view 920, corresponding to a task for managing resources. An additional entry for this new task is also shown in the revised task bar of FIG. 9A.

Figure 9B:
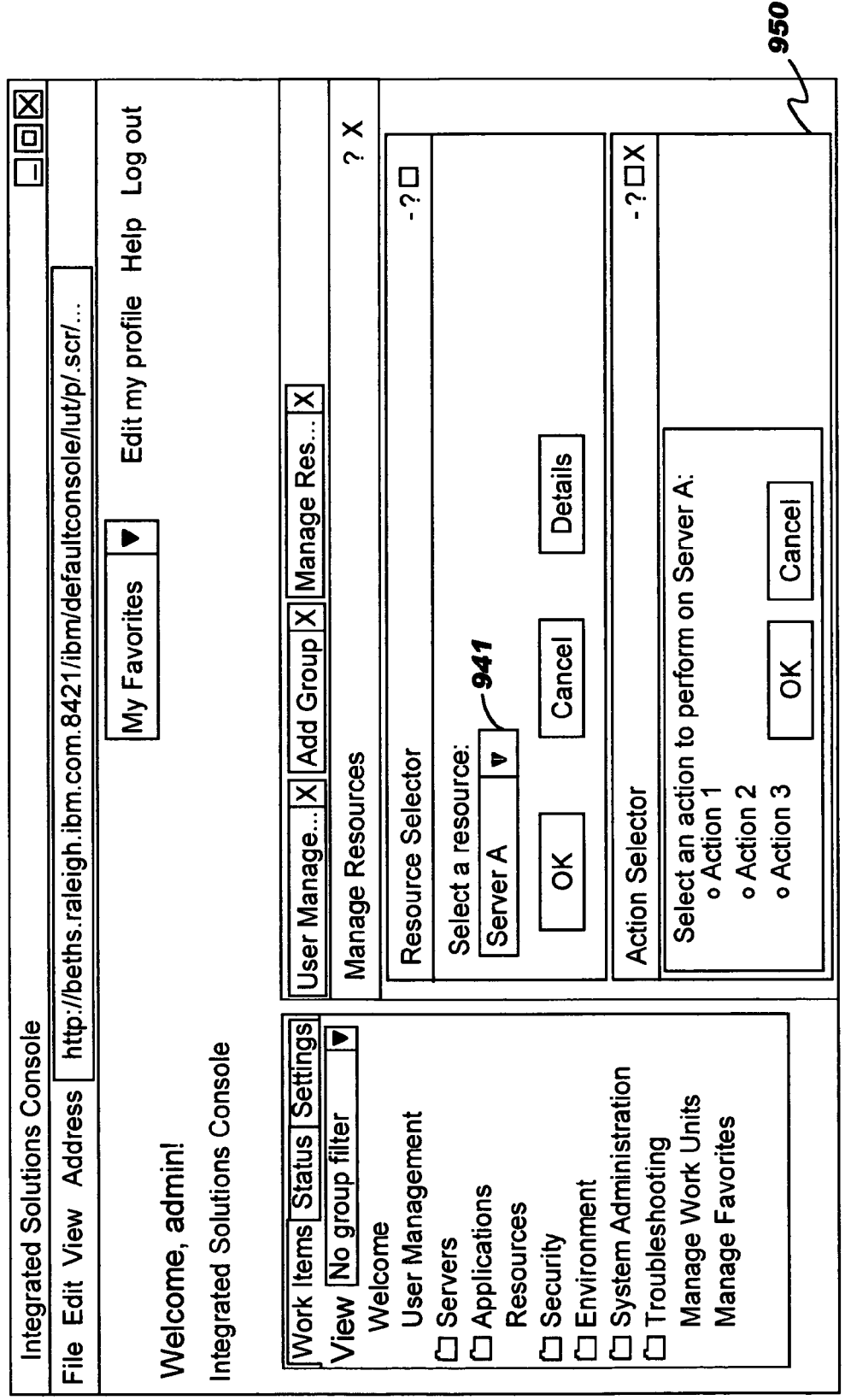

Preferred embodiments enable launching portlets dynamically within a rendered work unit view, causing the rendered view to be updated rather than overlaid. This is illustrated in FIG. 9B. Assume the user has selected "Server A" from a list of choices presented in the drop-down list at 930 of FIG. 9A (see reference number 941 in FIG. 9B), and then pressed the "Details" button 940 to see more detailed information pertaining to this resource. Responsive to this selection, a portlet for providing that detailed information is launched. Content from that portlet is dynamically added to the work unit view, as shown in FIG. 9B at reference number 950. In this example, the newly-added content informs the user of several different actions that are available for obtaining more detailed information for the selected resource (where these actions may be determined in various ways), and radio buttons are provided as a means for the user to select a desired action.

Selection of a resource of a different type than Server A from drop-down list 940 may result in adding different portlets to the work unit view, where the content of those portlets may differ from that shown at 950. If the portlet shown at 950 is appropriate for a subsequently-selected resource, then the already-rendered portlet view may be refreshed with new content for the newly-selected resource. If a different portlet is appropriate for the subsequently-selected resource, then the portlet shown at 950 may be closed and replaced with the new portlet content.

Once the user has finished the activity of managing resources, that work unit can be closed by activating the close indication provided in the work unit title bar or, alternatively, the indication provided in the task bar. At that point, the user's last-visited work unit view is redisplayed, in preferred embodiments, and therefore the user will be presented with the view 820 shown in FIG. 8. Rather than losing the already-entered group name (or other pertinent state), as is the case with prior art Web-based application implementations, preferred embodiments of the present invention retain that task-specific state information for the user. As a result, the user experience when using a Web-based application is more closely aligned with the user experience in a desktop computing environment, and user productivity may be significantly improved.

A further aspect of preferred embodiments (not demonstrated in FIGS. 9A and 9B) is that a launched work unit or portlet can be passed contextual information, such that it can render itself based upon the context in which it was launched. For example, if the initial work unit presents a list of users and a new work unit is then launched to display detailed information for a selected one of those users, that new work unit can be passed contextual information that enables it to be rendered specifically with detailed information for the selected user. In addition, contextual information can be refreshed at any point in time, and refreshed content based on that refreshed contextual information can be returned to the launched work unit. So, if the user viewing the display returns to the list of users and selects a different user, the focus can then be returned to the already-displayed work unit view providing detailed user information, where content in that view now pertains to the newly-selected user.

In addition, when a portlet is dynamically launched within a rendered work unit view, the context of that portlet can also be refreshed and the portlet's rendered content can be updated in response. For example, in the scenario discussed in FIGS. 9A and 9B where a portlet is dynamically launched to provide information pertaining to Server A, the user interacting with the view might select a different server, such as "Server B", from the drop-down list at 941 in FIG. 9B. The content rendered at 950 might then be changed, showing a different set of actions that pertains to that server (and its current state).

Figure 10:
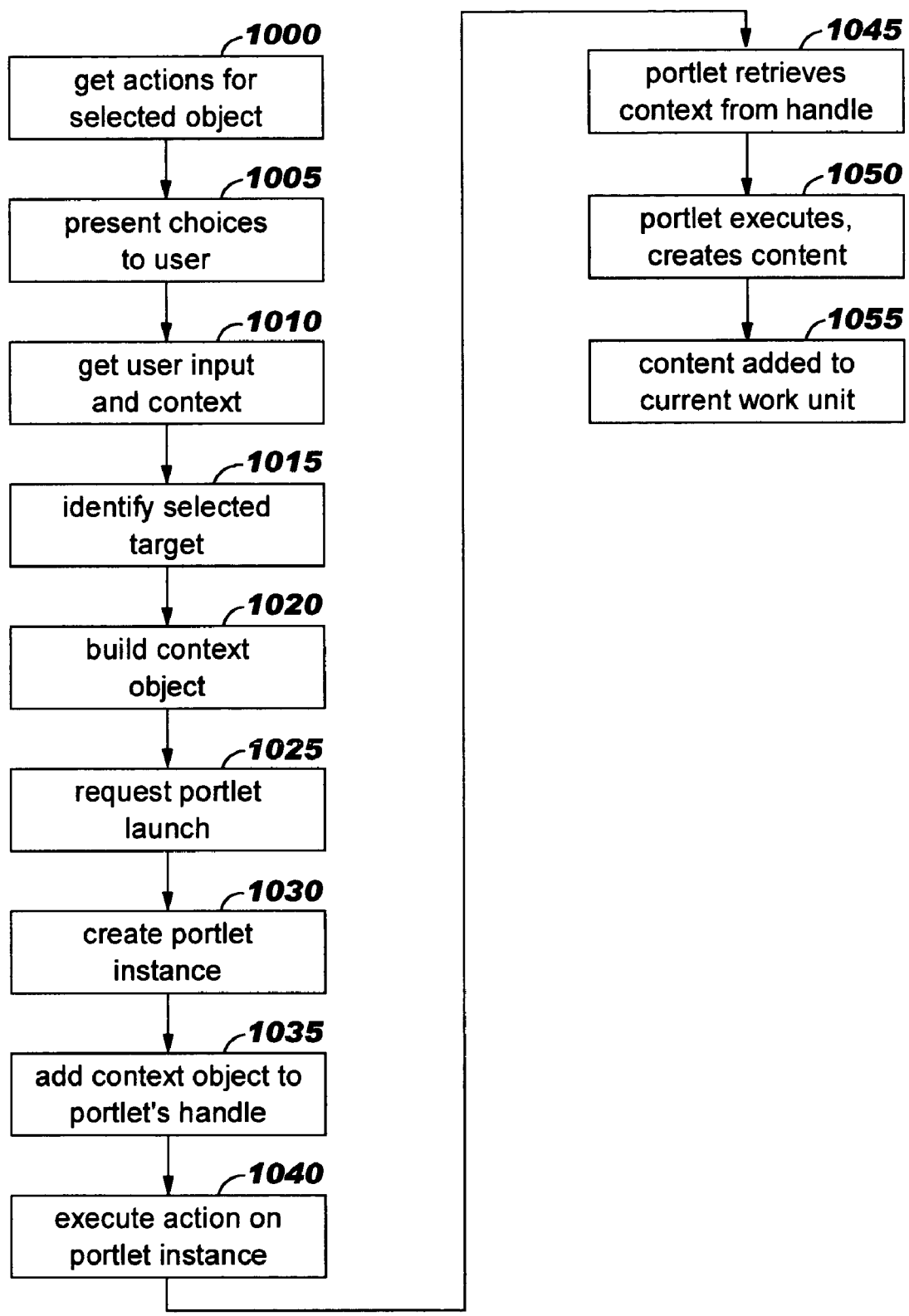
FIGS. 10-11 and 13 provide flowcharts depicting logic that may be used when implementing preferred embodiments of the present invention.
Figure 11:
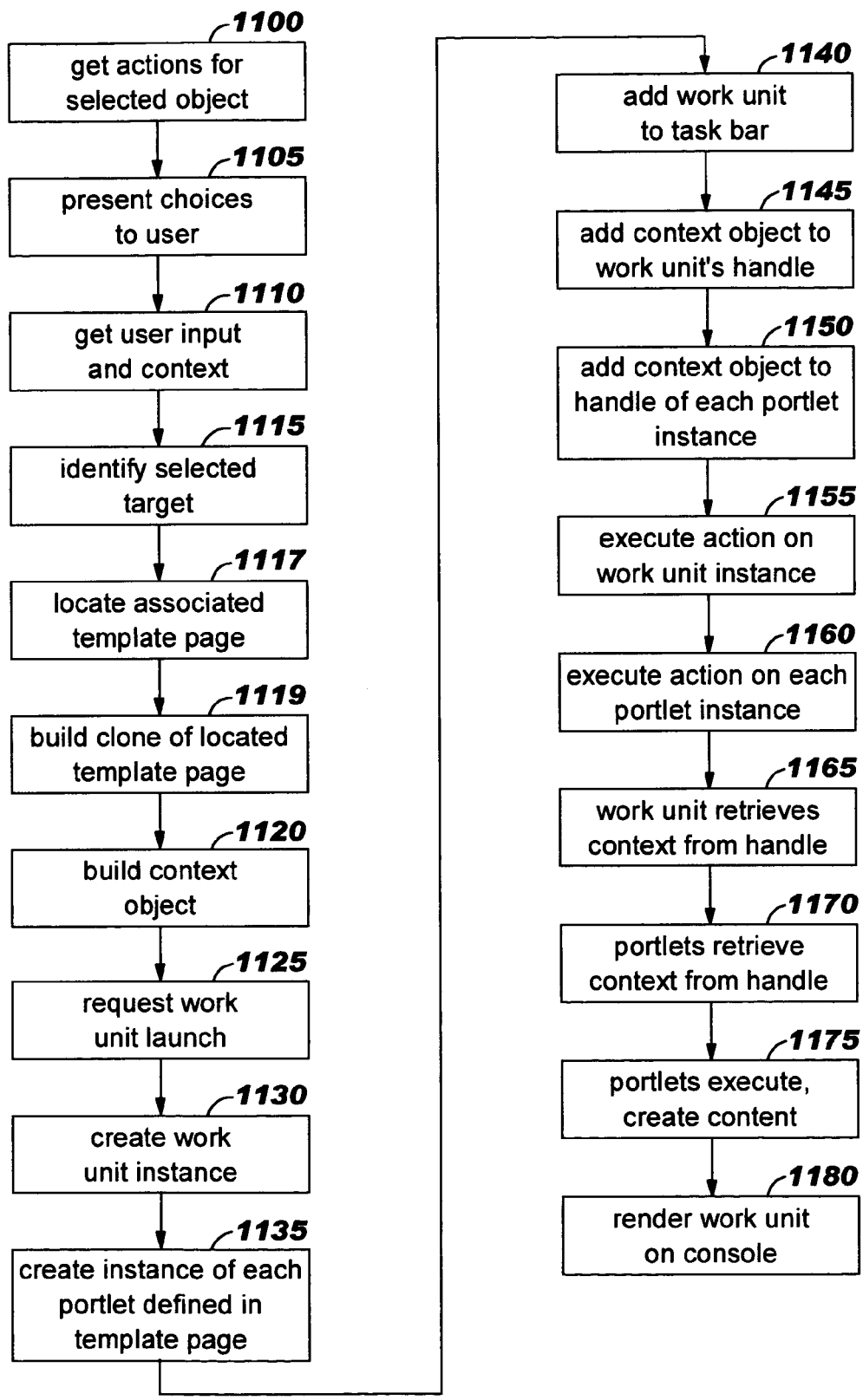
Figure 13:
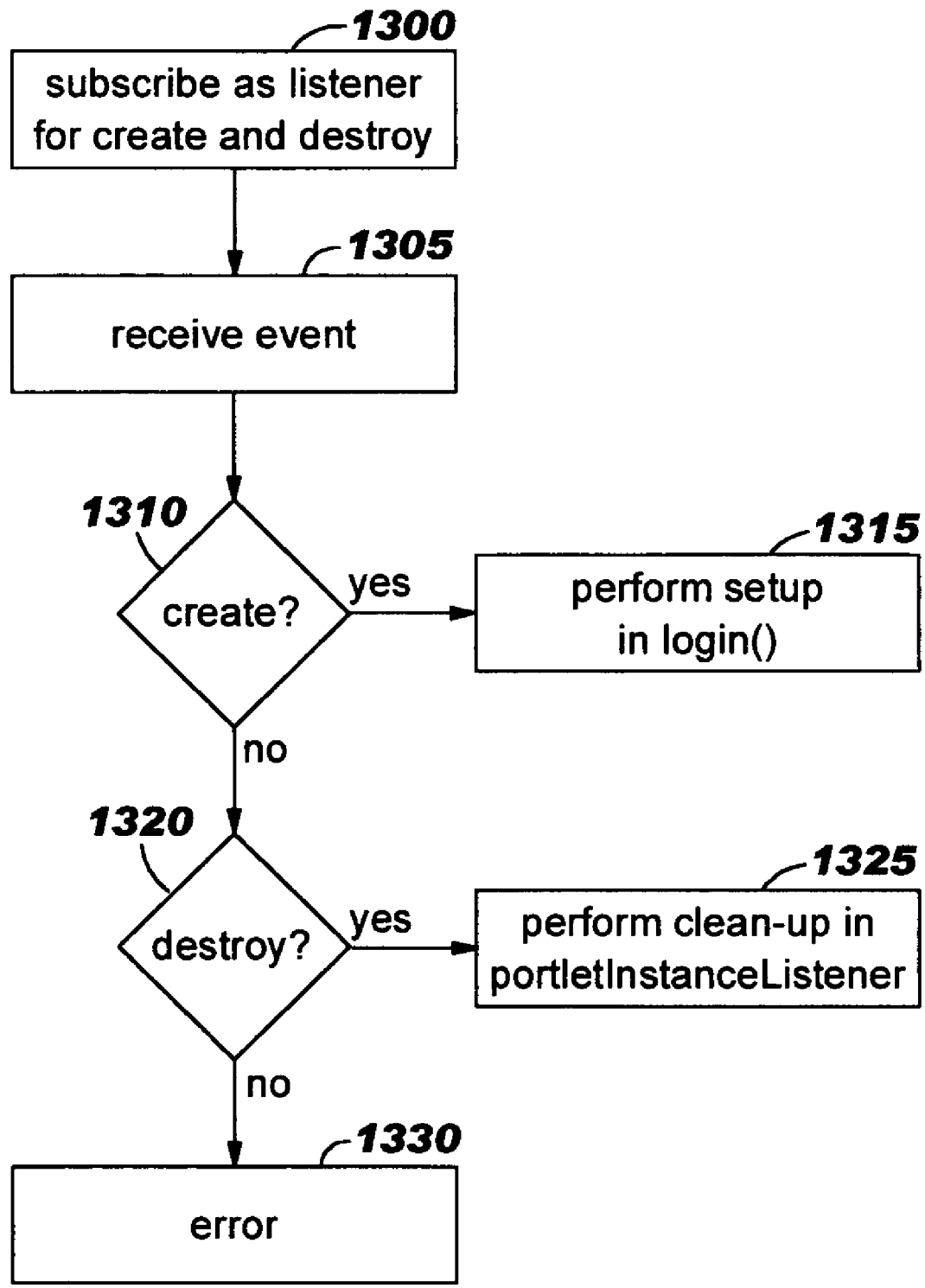

Turning now to FIGS. 10-11 and 13, flowcharts are presented depicting logic that may be used when implementing preferred embodiments of the present invention. Each of these flowcharts will now be described.

FIG. 10 provides logic illustrating a portlet launch according to preferred embodiments, and includes an optional capability for passing contextual information to the launched portlet. The processing of FIG. 10 operates responsive to the user's selection of an object, such as selecting the "Add new user group" choice 721 in FIG. 7. In other scenarios, the selection may occur in other ways, such as by selecting a rendered icon. In Block 1000, actions available for the selected object are determined. Available actions may be determined in a variety of ways (which do not form part of the present invention). In one approach, the source portlet (i.e., the portlet from which the user makes a selection) is queried, and that portlet returns a set of available actions. The choices are then presented to the user (Block 1005). A number of different approaches may be used for soliciting user input, as known in the art, including drop-down lists, pop-up menus, and so forth.

In Block 1010, user input identifying a target portlet is obtained. Appropriate contextual information may also be provided. In some cases, the contextual information may comprise the selected object itself. In other cases, the user may be requested to provide contextual information. A text entry box may be provided for this purpose, for example. Alternative approaches may also be used. For example, if an icon representing a managed resource is the selected object at Block 1000, a choice presented to the user at Block 1005 might be to open a log file associated with that resource, and the name of this log file might be used as contextual information for the target portlet. In any case, using the user's input obtained in Block 1010, the source portlet identifies the portlet to be invoked (Block 1015), and when contextual information is provided, a context object is constructed (Block 1020).

The target portlet is then launched (Block 1025), and in response, preferred embodiments of the present invention cause a new instance of the target portlet to be created (Block 1030). The context object created in Block 1020 is preferably added to an object handle associated with the new portlet instance (Block 1035) and an action is then executed on that portlet instance (Block 1040). Preferably, this action operates as a signal to the portlet instance, informing it that contextual information has been passed. In response, the portlet instance determines its object handle and retrieves the context object therefrom (Block 1045). The information in the context object may be used, for example, as set-up or initialization information for the new portlet instance. The portlet instance then executes its function (Block 1050), which typically results in creating content for display. That content is then added to the currently-viewed work unit (Block 1055).

A further feature of the present invention is that the contextual information that was passed as part of the launch may be refreshed at a later point in time. In this case, the processing of Blocks 1035-1050 may be executed, such that the updated contextual information can be replaced and the portlet's content can be rendered apart from a launch operation.

It will be obvious how the logic in FIG. 10 can be adapted for use with portlet launches where contextual information is not passed.

FIG. 11 is similar to FIG. 10 in a number of ways, and provides logic illustrating a work unit launch according to preferred embodiments—including an optional capability for passing contextual information to the launched work unit. The processing of Blocks 1100-1115 is identical to Blocks 1000-1015. At that point, the user's selection of an object and an action to take with respect to that object have been determined, the target work unit has been determined, and any contextual information to be passed to the work unit is also available. Block 1117 then locates the template page associated with the selected target work unit, and Block 1119 builds a clone of that template page.

When contextual information is provided, a context object is constructed (Block 1120), as in Block 1020.

The target work unit is then launched (Block 1125), causing a new instance of that work unit to be created (Block 1130). In addition, a new instance of each portlet defined in the template page for this work unit is also created (Block 1135). Block 1140 adds an entry for this new work unit instance to the task bar. The context object created in Blocks 1120 and 1125 is preferably added to an object handle associated with the new work unit instance (Block 1145) and also to an object handle associated with each of the new portlet instances (Block 1150). An action is then executed on the work unit instance (Block 1155) and on each of the portlet instances (Block 1160). Preferably, the action operates as a signal to the work unit instance and portlet instances, informing them that contextual information has been passed. In response, the work unit instance and each of the portlet instances determine their object handles and retrieve the context object therefrom (Blocks 1165 and 1170). The portlet instances then execute their function (Block 1175), and content created as a result is used to create an aggregated page which is then rendered on the user interface as the currently-viewable work unit (Block 1180).

As stated with reference to FIG. 10, the contextual information that was passed as part of the launch may be refreshed at a later point in time. In this case, the processing of Blocks 1145-1180 may be executed, such that the updated contextual information can be replaced and the work unit's content can be rendered apart from a launch operation.

As with FIG. 10, it will be obvious how the logic in FIG. 11 can be adapted for use with work unit launches where contextual information is not passed.

An exception to this processing is for so-called "singleton" pages. As this term is used herein, it refers to exceptions to the general rule that a new work unit instance is created for each task launched from the navigation pane. Preferably, a limited number of predetermined tasks are treated as singletons. Special processing performed for singleton pages, in addition to not creating a new instance of the page, preferably comprises the following: the corresponding work unit view does not have a close indication in its title bar, and an entry for this view is not added to the task bar.

FIG. 12 (comprising FIGS. 12A and 12B) provides a more detailed example of template page syntax of the type that may be used with preferred embodiments. In this example, a component specification 1200 includes definitions of two pages 1210, 1230. (Refer to the content aggregation invention for more information about component specifications and how they are used.) Page definition 1210 specifies, in this example, that two portlets 1212, 1214 will be present on this work unit view at invocation, and that any dynamically-launched portlet content should be rendered underneath the aggregated content of those portlets, using a 3-column layout (see attribute 1216). Page definition 1230 specifies that a single portlet 1232 will be present on this work unit view at invocation, and absence of the launchPortletColumns attribute on  element 1234 indicates that a default 1-column layout should be used for rendering any dynamically-launched portlet content on this work unit view.

Preferred embodiments of the present invention provide a task life-cycle for portlets within a work unit instance (which is an extension of the life cycle of a portlet itself). This enables advantageous features of the present invention, including the ability to safely release resources allocated to a portlet or work unit when that portlet or work unit is being closed. Accordingly, a portlet instance according to preferred embodiments may be in an active state or an inactive state. The active state is entered upon creation of the portlet instance, and the inactive state is entered upon removing or destroying the portlet instance. The portlet author can therefore perform any necessary setup processing before a newly-launched portlet instance is presented to the user and can also perform clean-up processing when a portlet instance is being removed.

Life cycle operations are depicted in the flowchart in FIG. 13. Portlets preferably register or subscribe as listeners to receive create and destroy events (Block 1300) as portlet instances come and go. A method is preferably provided that enables this registration (and portlets may also register as listeners for other events, using techniques which are known in the art). According to preferred embodiments, the "init"

method of the portlet is used, and the portlet passes an object implementing the listener interface to enable distinguishing between portlet instances for portlets having a particular portlet name. This listener will be invoked upon portlet destruction when a portlet instance is closed or when a work unit view containing that instance is closed. In preferred embodiments, initialization is addressed using the "PortletSessionListener" interface of WebSphere Portal Server.

When an event is received (Block 1305), a test is made to determine whether it is a "create" event (Block 1310). If so, control transfers to Block 1315, where portlet-specific set-up processing can be performed (including allocation of appropriate resources).

More particularly, when an embodiment of the present invention receives a request to launch a portlet instance on a work unit, a "login( )" method based upon the PortletSessionListener interface is preferably invoked in the portlet if it implements this interface. Notably, this invocation occurs before the portlet instance is rendered on the work unit.

When a request arrives to launch a new work unit, preferred embodiments preferably iterate through all portlet instances defined on the template page for that work unit. For each of these portlet instances, a login( ) invocation is made on the portlet's assigned listener (if one has been assigned).

If the test in Block 1310 has a negative result, then another test is performed at Block 1320 to determine whether the received event was a "destroy" event. If so, control transfers to Block 1325, where portlet-specific clean-up processing can be performed (including release of previously-allocated resources). In preferred embodiments, this processing is performed using a method of the "portletInstanceListener" interface.

More particularly, when an embodiment of the present invention receives a request to close a portlet instance on a work unit, a portletInstanceDestroyed method is preferably invoked against the registered object assigned to all instances having that specified portlet name. Notably, this invocation occurs before the portlet instance is removed from the work unit. The portlet session object corresponding to the portlet instance that is to be removed is passed on the method invocation, and the portlet instance preferably uses information accessible from this session object when releasing any necessary back-end resources for the instance.

And, when a request arrives to close a work unit, preferred embodiments preferably iterate through all portlet instances defined on the template page for that work unit. For each of these portlet instances, a portletInstanceDestroyed invocation is made on the portlet's assigned listener (if one has been assigned). If multiple instances of the same portlet name are found on the work unit, multiple invocations of the method will be made, each with its own session object. The destroy event is processed before the work unit is removed, and this iteration of the processing of FIG. 13 then ends.

Otherwise, when the test in Block 1320 has a negative result, then the event is neither a create event nor a destroy event. Prior art error handling may be performed (Block 1330), or the event may be ignored.

When a user session times out or is explicitly terminated, preferred embodiments programmatically terminate all tasks associated with that session. This ensures that system resources are not wasted. Preferably, destroy events are sent to all currently-active work units in this situation, allowing for an orderly shut-down as has been described with reference to FIG. 13.

Figure 14:
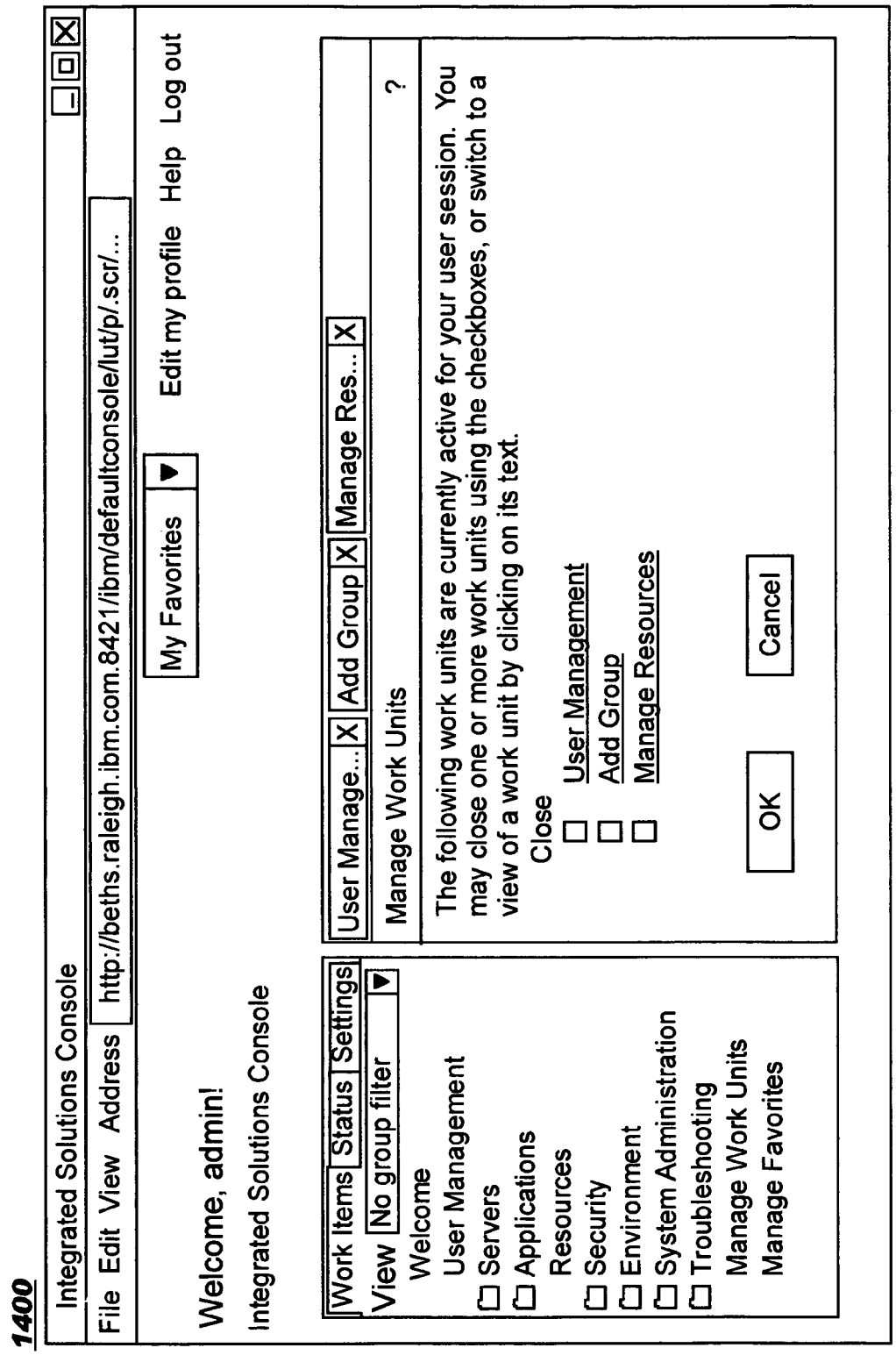

Preferred embodiments preferably store a collection of the work unit handles for all currently-active work units in a session variable associated with this user session. This collection can then be used for various administrative operations that may be desirable. For example, a selectable task may be provided from the navigation bar for managing work units. (This task is preferably treated as a singleton, in that only one instance can be created.) A work unit view for this task preferably provides the user with an at-a-glance view of each currently-active work unit and enables the user to close one or more work units (e.g., using checkbox entries) or to switch to a view of one of the work units (e.g., by treating the rendered information for the work units as selectable hyperlinks). See FIG. 14 for a sample view 1400 that may be used for this purpose. Optionally, an entry may be created in the task bar for this Manage Work Units view, although this has not been illustrated in the figures.

When a work unit is closed (either by the user or through programmatic operations), its entry in the session object that stores the collection of work unit handles is removed. When the user session ends, this collection may be used to determine which work units and portlets should be notified of the end of their life cycle (i.e., by sending destroy events thereto, as discussed above).

Note that portlets participating in the task-based user interface, according to preferred embodiments, do not need to be aware that they are being used in a task-based user interface unless they choose to exploit it. Therefore, existing portlets can run unchanged. (For example, portlets may also be queried to determine whether they are capable of reporting contextual information for use with the task-based interface. If a portlet does not provide an expected response to this query, it may be assumed that this portlet is not adapted for use with embodiments of the present invention. In this case, substitute content, such as "information not available", may be used instead of restoring content using contextual information that pertains to the portlet.)

Optionally, embodiments of the present invention may be adapted for providing "favorites" or "favorite page" processing of the type provided by well-known Web browser software, wherein user-specific choices can be made about particular views to be persisted for subsequent retrieval. Preferred embodiments therefore provide users with a way to save a work unit view as a favorite, in which case a copy of that work unit is persisted (at least temporarily) as a new page (similar to a template page). The manner in which this processing occurs in preferred embodiments will now be described.

A container hierarchy is used for persisting favorites, and each user selection is added to a root of this container hierarchy. Each user automatically has authorization to view pages he or she created within this container. The layout of the work unit will be persisted, including views added from any dynamically-launched portlets.

Preferably, an icon or tool bar entry (such as "Add to Favorites") is provided with which the user can signify that the currently-displayed work unit view is to be persisted as a favorite. A method is preferably invoked on each portlet of the work unit to enable that portlet to report applicable contextual information, and this reported contextual information is then preferably persisted in portlet properties or settings to be used when the work unit is subsequently recalled, via favorites processing, by the user.

A "Manage Favorites" view is preferably provided, with which users can see an at-a-glance view of all presently-persisted favorite pages (e.g., by presenting a textual version of the work unit title or other identifier). Preferably, this view has a layout similar to that shown in FIG. 14. Users may be allowed to associate their own unique identifiers with persisted favorites, and to modify those identifiers, from this view.

A user may recall a previously-persisted favorite, causing the persisted layout and portlet state to be redisplayed as the currently-viewable work unit. See, for example, reference number 910 in FIG. 9A, where a drop-down list titled "My Favorites" is provided: preferred embodiments enable a user to thereby make a selection. (Other techniques for providing selectable favorites may be used alternatively.) Upon making a selection, a new work unit instance is created from the persisted template. That instance is then preferably treated in an analogous manner to other work unit instances created from template pages. (For example, portlets specified in the template page definition for the favorite will be rendered within the boundary of a container as illustrated at reference number 410 of FIG. 4, and will not be individually closeable, while any newly-launched portlets will be rendered within the boundary of a container as illustrated at reference number 430 and these portlets will be closeable.)

A user may delete previously-persisted favorites, if desired (for example, by checking a box associated with that favorite on the Manage Favorites view). The persisted template is then deleted from the container hierarchy.

The content aggregation invention discussed page definitions that reference portlets which are not presently available (e.g., the portlets have not been deployed, or the current user is not authorized to see content created by those portlets, and so forth). This may also occur with the portlets specified in template pages for work units that are selectable from the navigation pane, and/or in templates created for favorites, of the present invention. Accordingly, when rendering a work unit view from a template page (in either situation), preferred embodiments determine whether each of the portlets on that page are available. If not, then no content from that portlet is included in the aggregated work unit view. If a work unit view from which portlet content has been omitted in this manner is subsequently persisted as a favorite, then the template created for that favorite preferably omits reference to the unavailable portlet. In this manner, the favorite will appear with the same content upon subsequent recall by the user. Optionally, a repository may be updated with information about which portlets are referenced in persisted favorites. Thus, upon undeploying a component containing portlets, this repository can be consulted to see if any of the favorites include references to now-unavailable portlets. If so, the persisted templates may be revised. (Alternatively, this processing may be deferred until the user subsequently requests that a favorite be recalled, in which case the portlet references in the template may be checked and any portlets which are not presently available can be bypassed.)

As an alternative, rather than omitting references to unavailable portlets when persisting favorites, references to unavailable portlets may be included in the template for a favorite. A dynamic decision can then be made, if the user selects to recall the favorite, as to which portlets from this template are currently available. This approach enables including content from portlets for which the user is now authorized as well as content from portlets that were deployed after the favorite was persisted.

In an optional enhancement, embodiments of the present invention may persist the association with state information across console sessions (or similar sessions) using means common in the art, such that the state data for tasks that are left incomplete at the end of one console session is available the next time the user logs on, thus allowing the user to resume work on the incomplete task. In this case, resources associated with the incomplete instances may be programmatically released when the session closes and reattached when the user logs back on.

A task-based user interface is provided by the Windows operating system which is available from Microsoft Corporation, and Netscape Version 7 (a product of Netscape Communications Corporation) provides a mechanism to have multiple instances of a particular activity in different states concurrently. The Windows operating system provides a task-based user interface for the Intel desktop computing environment, but is not a Web-enabled task-based user interface for a Web-based application as disclosed herein. Netscape Version 7 also provides a tab-style implementation similar to the task bar of preferred embodiments, enabling users to quickly and easily switch between activities. However, the net effect is several browsers nested within one window: the user must choose a new "browser" window before launching an activity to be treated as a "task". This is in contrast to embodiments of the present invention, where a new page is presented responsive to selection of a new task. Netscape Version 7 also does not provide a programmatic means for launching other tasks, in contrast to preferred embodiments of the present invention. Netscape Version 7 also does not provide techniques for communicating creation or destruction of tasks so that system resources can be allocated or deallocated. Finally, it provides no mechanism for communicating among tasks: instead, each task is essentially an island.

As has been demonstrated, the present invention defines advantageous techniques for providing Web-based applications with a task-based user interface. Techniques disclosed herein may be used in a variety of scenarios, and a number of such scenarios have been depicted in the examples presented herein. Portlets rendered when using embodiments of the present invention may perform operations that include, but are not limited to, querying resources and/or altering the state of those resources (where the state may be altered, for example, by issuing commands to a resource, such as starting or stopping one or more servers or other devices).

As will be appreciated by one of skill in the art, embodiments of techniques of the present invention may be provided as methods, systems, or computer program products. Preferably, an implementation of techniques of the present invention is provided in software, although implementations provided in hardware or firmware, or combinations of software with hardware and/or firmware, are also within the scope of the present invention. Furthermore, an implementation of techniques of the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of dynamically adding content to a displayed work unit view in a task-based interface for a Web-based application, the task-based interface provided in a content aggregation framework, comprising:
    responsive to a request to execute a selected task, initially creating a work unit view to display the selected task in the content aggregation framework, comprising:
        locating a template page definition that corresponds to the selected task;
        invoking each of at least one content-creating software entity identified in the template page definition, the located template page definition further specifying a layout of the work unit view to display the selected task; and
        rendering, in the work unit view according to the specified layout, content created by each of the at least one invoked content-creating software entity;
    displaying the work unit view in the content aggregation framework;
    responsive to a request for dynamic invocation, from the displayed work unit view, of an additional content-creating software entity that is not identified in the template page definition, dynamically updating the work unit view to include content resulting from dynamically invoking the additional content-creating software entity, comprising:
        creating a container, the container comprising a work unit view area and a row for the resulting content;
        rendering, in the work unit view area of the container, the currently-displayed work unit view;
        invoking the additional content-creating software entity; and
        rendering, in the row of the container, the content resulting from invoking the additional content-creating software entity; and
    displaying the dynamically-updated work unit view, as a replacement for the currently-displayed work unit view, using the container.

2. The method according to claim 1, wherein the row in the container is selectably closable to cause removing, from the dynamically-updated work unit view, the content resulting from invoking the additional content-creating software entity.

3. The method according to claim 2, wherein an instance of the additional invoked content-creating software entity is destroyed responsive to closing the row in the dynamically-updated work unit view.

4. The method according to claim 2, wherein resources associated with the additional invoked content-creating software entity are programmatically released responsive to closing the row in the dynamically-updated work unit view.

5. The method according to claim 2, wherein the row is selectably closable by selecting, from the dynamically-updated work unit view, a graphical control corresponding to the row.

6. The method according to claim 1, further comprising saving the new container and associated state information, along with contextual information associated with the additional invoked content-creating software entity, at least temporarily, for subsequent recall and display of the dynamically-updated work unit view.

7. The method according to claim 1, wherein the content-creating software entities are portlets.

8. The method according to claim 1, wherein the content aggregation framework is a portal.

9. The method according to claim 1, further comprising:
    updating contextual information used by the additional invoked content-creating software entity when initially creating the resulting content, responsive to receiving an update trigger;
    rendering, in the row of the container, an updated version of the resulting content, the updated version created by subsequently invoking the additional content-creating software entity using the updated contextual information; and
    re-displaying the dynamically-updated work unit view using the updated version of the resulting content rendered in the row of the container.

10. The method according to claim 1, wherein:
    the template page definition further specifies a number of columns to use when dynamically adding content to the row in the work unit view; and
    the rendering, in the row of the container, the content resulting from invoking the additional content-creating software entity comprises rendering, in the row of the container, the resulting content into a first-available one of the specified number of columns within the row.

11. The method according to claim 1, further comprising saving, at least temporarily, contextual information associated with each of the at least one content-creating software entity identified in the template page definition and contextual information associated with the additional invoked content-creating software entity, thereby enabling each of the content-creating software entities to restore itself upon subsequent recall for display of the dynamically-updated work unit view.

12. The method according to claim 11, wherein the saving operates responsive to a request to close the displayed dynamically-updated work unit view.

13. A system for dynamically adding content to a displayed work unit view in a task-based interface for a Web-based application, the task-based interface provided in a content aggregation framework, comprising:
    a computer comprising a processor; and
    instructions which are executable, using the processor, to perform:

responsive to a request to execute a selected task, initially creating a work unit view to display the selected task in the content aggregation framework, comprising:
  locating a template page definition that corresponds to the selected task;
  invoking each of at least one content-creating software entity identified in the template page definition, the located template page definition further specifying a layout of the work unit view to display the selected task; and
  rendering, in the work unit view according to the specified layout, content created by each of the at least one invoked content-creating software entity;
displaying the work unit view in the content aggregation framework;
responsive to a request for dynamic invocation, from the displayed work unit view, of an additional content-creating software entity that is not identified in the template page definition, dynamically updating the work unit view to include content resulting from dynamically invoking the additional content-creating software entity, comprising:
  creating a container, the container comprising a work unit view area and a row for the resulting content;
  rendering, in the work unit view area of the container, the currently-displayed work unit view;
  invoking the additional content-creating software entity; and
  rendering, in the row of the container, the content resulting from invoking the additional content-creating software entity; and
displaying the dynamically-updated work unit view, as a replacement for the currently-displayed work unit view, using the container.

14. A computer program product for dynamically adding content to a displayed work unit view in a task-based interface for a Web-based application, the task-based interface provided in a content aggregation framework, the computer program product embodied on at least one computer-usable storage media having computer-usable program code embodied therein for:
  responsive to a request to execute a selected task, initially creating a work unit view to display the selected task in the content aggregation framework, comprising:
    locating a template page definition that corresponds to the selected task;
    invoking each of at least one content-creating software entity identified in the template page definition, the located template page definition further specifying a layout of the work unit view to display the selected task; and
    rendering, in the work unit view according to the specified layout, content created by each of the at least one invoked content-creating software entity;
  displaying the work unit view in the content aggregation framework;
  responsive to a request for dynamic invocation, from the displayed work unit view, of an additional content-creating software entity that is not identified in the template page definition, dynamically updating the work unit view to include content resulting from dynamically invoking the additional content-creating software entity, comprising:
    creating a container, the container comprising a work unit view area and a row for the resulting content;
    rendering, in the work unit view area of the container, the currently-displayed work unit view;
    invoking the additional content-creating software entity; and
    rendering, in the row of the container, the content resulting from invoking the additional content-creating software entity; and
  displaying the dynamically-updated work unit view, as a replacement for the currently-displayed work unit view, using the container.

* * * * *